United States Patent [19]
El Malki

[11] Patent Number: 6,044,068
[45] Date of Patent: Mar. 28, 2000

[54] SILENCE-IMPROVED ECHO CANCELLER

[75] Inventor: Karim El Malki, Rome, Italy

[73] Assignee: Telefonaktiebolaget LM Ericsson, Stockholm, Sweden

[21] Appl. No.: 08/725,656

[22] Filed: Oct. 1, 1996

[51] Int. Cl.$^7$ .............................. H04B 3/20; H04M 1/00
[52] U.S. Cl. ........................................... 370/286; 379/406
[58] Field of Search ...................................... 370/286, 287, 370/288, 289, 290; 379/406, 407, 409, 410, 416

[56] References Cited

U.S. PATENT DOCUMENTS

| | | |
|---|---|---|
| 4,582,963 | 4/1986 | Danstrom . |
| 4,593,161 | 6/1986 | Desblache et al. . |
| 4,645,883 | 2/1987 | Horna et al. . |
| 4,736,414 | 4/1988 | Montagna et al. . |
| 4,751,730 | 6/1988 | Galand et al. . |
| 4,903,247 | 2/1990 | Van Gerwen et al. . |
| 4,998,241 | 3/1991 | Brox et al. ............... 370/290 |
| 5,016,271 | 5/1991 | Ford ........................ 379/410 |
| 5,263,020 | 11/1993 | Yatsuzuka et al. . |
| 5,295,136 | 3/1994 | Ashley et al. . |
| 5,471,470 | 11/1995 | Sharma et al. . |
| 5,473,686 | 12/1995 | Virdee . |
| 5,548,642 | 8/1996 | Diethorn . |
| 5,649,011 | 7/1997 | Garofalo et al. . |
| 5,687,229 | 11/1997 | Sih .......................... 379/410 |
| 5,732,134 | 3/1998 | Sih .......................... 379/406 |
| 5,748,726 | 5/1998 | Unno ...................... 379/406 |

FOREIGN PATENT DOCUMENTS 0 182 096 A2   5/1986   European Pat. Off. .
0 627 840 A2   12/1994   European Pat. Off. .

OTHER PUBLICATIONS

Sondhi and Berkley; "Silencing Echoes on the Telephone Network", Proceedings of the IEEE, vol. 68, No. 8, pp. 948–963, 1990.

Messerschmitt, "Echo Cancellation in Speech and Data Transmission", IEEE Journal on Selected Areas in Communications, vol. 2, No. 2, pp. 283–297, 1984.

Duttweiler and Chen, "A Single–Chip VLSI Echo Canceler", The Bell system Technical Journal, vol. 59, No. 2, pp. 149–160, 1980.

Fertner, U.S. Patent Application Ser. No. 08/679,387, "Frequency Domain Signal Reconstruction in Sampled Digital", filed Jul. 8, 1996.

*Primary Examiner*—Chi H. Pham
*Assistant Examiner*—Steven Nguyen
*Attorney, Agent, or Firm*—Nixon & Vanderhye, P.C.

[57] ABSTRACT

An echo cancellation method and apparatus (20) determines whether a window W(m) of samples on an incoming communications path (30) contains silence, the window W(m) including the sample obtained at time t(m) and prior samples. If the window W(m) contains silence, coefficients of an adaptive filter (52) of the echo canceller (20) are set to silence detection values prior to receipt of a sample at time t(m+1). If the window W(m) does not contain silence and there is no double-talk, the sample obtained at time t(m) is used to update coefficients of the adaptive filter; the adaptive filter as updated generates an echo estimate after a sample is obtained at time t(m+1); and, the echo estimate is used to modify a signal on an outgoing communications path (32).

16 Claims, 12 Drawing Sheets

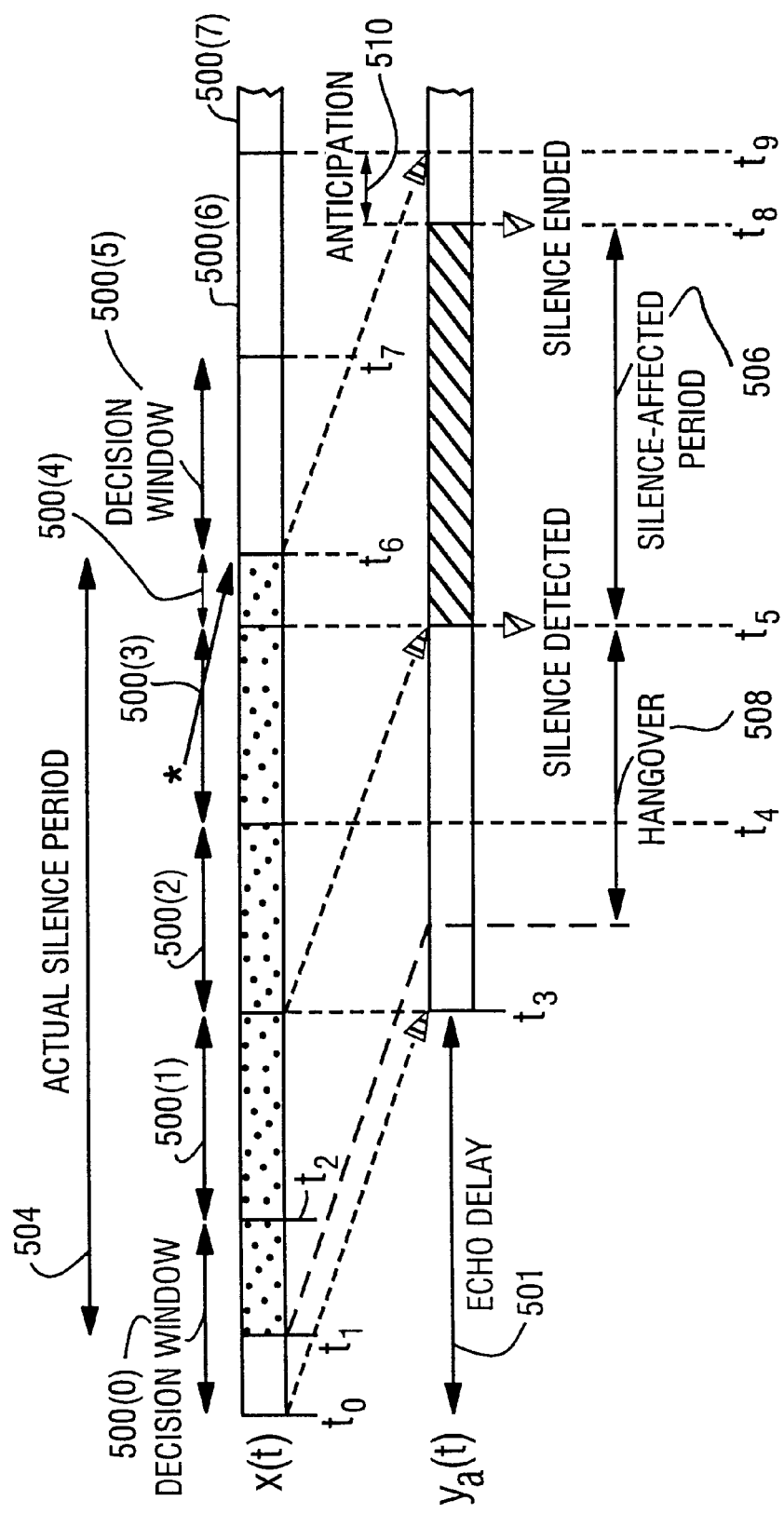

SILENCE-IMPROVED ECHO CANCELLER

This application is related to U.S. patent application Ser. No 08/725,655 filed simultaneously by Karim El Malki, entitled "ECHO PATH DELAY ESTIMATION" and incorporated herein by reference.

BACKGROUND

1. Field of Invention

This invention pertains to speech and acoustic signal processing, and particularly to cancellation of echoes.

2. Related Art and Other Considerations

Echo cancellers are widely used both in terrestrial and atmospheric (i.e. radio, microwave) communication to eliminate the "echo" phenomenon which greatly affects the quality of speech and audio services. An echo canceller essentially uses a copy of the data incoming to a listener to digitally estimate the echo that should return on the outgoing line. Having calculated the estimate, the echo canceller subtracts the echo estimate from the outgoing signal such that the echo cancels out.

An example of the problem of echo occurs in telephonic transmissions. In most cases, a phone conversation is transmitted between terminating equipment (TE) and a hybrid transformer circuit over a pair of unidirectional 2-wire lines (i.e., over four wires), and then from the hybrid circuit over a bidirectional 2-wire line. Thus, the junction between the two types of lines is implemented by the hybrid transformer. Since hybrid transformers are balanced for an average line impedance, they do not perfectly separate the two unidirectional paths from each other, and therefore they create echo signals. Moreover, if a delay is introduced in the four wire path (as can occur for satellite transmission or for digital encoding), the echoes must be canceled to ensure better speech quality.

Simply speaking, echo cancellers typically employ an adaptive finite impulse response (FIR) digital filter; a cancellation processor for controlling the FIR; a subtractor; a near-end speech detector; and, a non-linear processor. The FIR receives the copy of the data (as it is successively sampled) which is transmitted from the far end on an incoming communications path to the near end. The FIR generates an estimate of the echo which would, unless canceled, be reflected back from the near end to the far end on an outgoing communications path. At the appropriate time, the FIR's estimate of the echo is subtracted by the subtractor from the signal on the outgoing communications path in an attempt to cancel out the echo. In generating its estimate of the echo, the FIR is controlled by the cancellation processor. In controlling the FIR the cancellation processor takes into consideration the signal output from the subtractor as well as any indication from the near-end speech detector that double-talk is occurring (e.g., that both parties at the far and near end are talking). The non-linear processor attempts to suppress any remaining amount of echo which the FIR is unable to cancel.

The FIR is a transversal filter with a number of taps and a corresponding number of coefficients. A tap is a unit of delay time equal to the sampling time or sampling rate. The coefficients are values (stored in registers) which are multiplied by the input signal in order to obtain the echo estimate. The cancellation processor executes an algorithm for adapting (e.g., modifying or updating) the filter coefficients, so that the filter coefficients converge to optimum (or near optimum) values faster than the echo response characteristics change and thereby enable cancellation of the echo.

In most echo cancelers such adaptation does not occur while the near-end speech detector detects the double-talk condition. The length of the FIR (number of taps) and the rate at which the coefficients must be updated depends on the type of service, the path (e.g., line) characteristics, and the distance of the echo source from the canceller.

Many conventional echo cancellers implement classical gradient adaptive filter algorithms such as the Least Mean Squared (LMS) and its normalized variation. The problem with these conventional algorithms is that, although they are among the simplest in terms of computational complexity, they still pose a great burden on digital signal processing devices. This inevitably increases the cost of such devices, even when pooled and thus shared among channels. Certain adaptive filtering algorithms with lower computational complexity have emerged, such as the Sign family of algorithms, but their slow convergence and instability concerns have impeded their exploitation in the field of echo cancellers. Another simplification has been that of using block algorithms, such that the adaptation is performed only once every "n" samples. Block algorithms reduce complexity but decrease the ability of the echo canceller to adapt to variations.

It is known to use the signal level on the incoming communications path to influence the operation of echo cancelers. U.S. Pat. No. 4,712,235 to Jones uses the received signal activity for controlling updating of the adaptive filter of an echo canceller. U.S. Pat. No. 5,315,585 to Iizuka et al. mentions as prior art the inhibiting of updating of filter coefficients during double talking or during a period when a low level detector detects a linear receive input signal having a low level. In U.S. Pat. No. 4,894,820 to Miyamoto et al., if the received signal is idle, the estimation function of an adaptive digital filter is inhibited.

What is needed is an echo cancellation method and apparatus which effectively minimizes operation of the FIR during incoming periods of silence, and thereby minimizes the computational complexity of the echo cancellation operation.

SUMMARY

An echo cancellation method and apparatus determines whether a window W(m) of samples on an incoming communications path contains silence, the window W(m) including the sample obtained at time t(m) and prior samples. If the window W(m) contains silence, coefficients of an adaptive filter of the echo canceller are set to silence detection values prior to receipt of a sample at time t(m+1). If the window W(m) does not contain silence and there is no double-talk, the sample obtained at time t(m) is used to to update coefficients of an adaptive filter, the adaptive filter as updated generates an echo estimate after a sample is obtained at time t(m+1), and the echo estimate is used to modify a signal on an outgoing communications path.

If a received window W(m) contains silence, in addition to setting the coefficients of an adaptive filter to silence detection values, the echo canceller conducts one of the following (prior to receipt of a sample at time t(m+1)): (1) applying a predetermined noise on the outgoing communication path during the silence-affected period; (2) suppressing any remaining echoes on the outgoing communication path that are not suppressed by the filter of the echo canceller. Depending on the nature of the detected silence, the coefficients of the adaptive filter are either set to zero and maintained at zero or are frozen at coefficient values which preceded the detecting of silence.

If the window W(m) contains silence, the echo canceller determines a timing of a silence-affected period on the outgoing communications path. Determinations of the silence-affected period involve both a short echo path delay case and a long echo path delay case. In the short echo path delay case, the silence-affected period is commenced at an end of a first instance of a window W(s) having the silence detected throughout its duration and the silence-affected period is terminated upon cessation of the silence in the signal on the incoming communication path. In the long echo path delay case, the silence-affected period is commenced at a point in the signal on the outgoing communication path which corresponds to an end of a first instance of a window having the silence detected throughout its duration, and the silence-affected period is terminated at a predetermined anticipation interval prior to a point in the signal on the outgoing communication path which corresponds to cessation of the silence in the signal on the incoming communication path.

The short echo path delay case and the long echo path delay case both have non-overlapping window implementations and overlapping window implementations.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5 is a diagrammatic view of a window-based silence detection method when echo path delay is longer than a decision window using a non-overlapping window implementation.

DETAILED DESCRIPTION OF THE DRAWINGS

Figure 1:
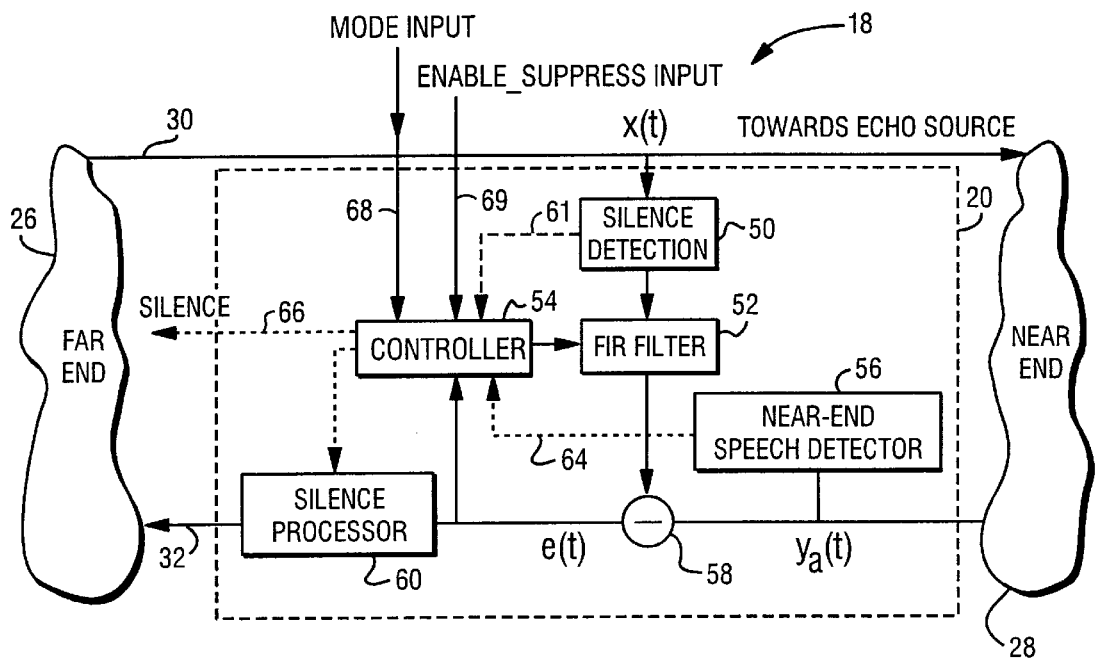
FIG. 1 is a schematic view of an echo canceller according to an embodiment of the invention.

FIG. 1 shows a communications system 18 which utilizes an echo canceller 20 according to an embodiment of the invention. Communications system 18 is illustrated as having a far end 26 and a near end 28. An incoming communications path 30 carries signals from far end 26 to near end 28; an outgoing communications path 32 carries signals from near end 28 to far end 26. Paths 30 and 32 may be terrestrial lines (e.g., wires) or microwave channels or may involve satellite linkages.

Figure 2:
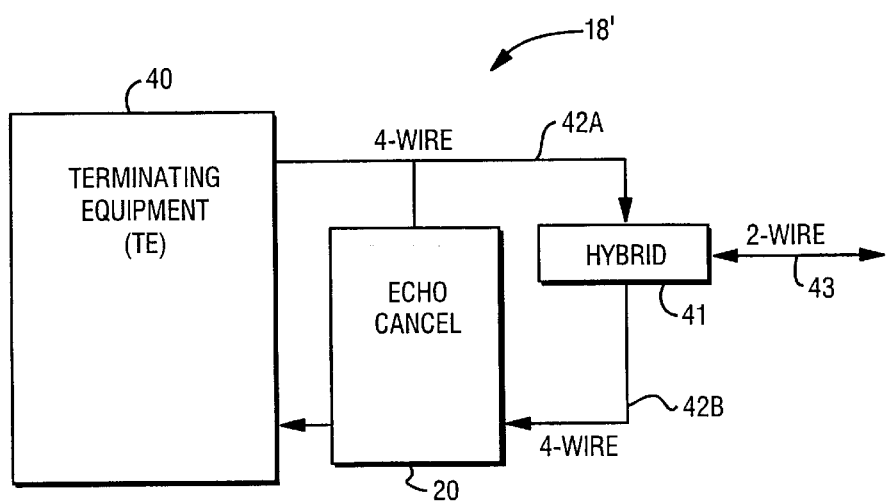
FIG. 2 is a schematic view of an example communications system which utilizes the echo canceller of FIG. 1.

FIG. 2 shows one example of a communications system 18' which utilizes echo canceller 20. The example of FIG. 2 is a telephonic communications system 18' wherein a telephone conversation is transmitted between terminating equipment (TE) 40 and a hybrid transformer circuit 41 over a pair of unidirectional 2-wire lines 42A, 42B (i.e., over four wires), and then from the hybrid circuit 41 over a bidirectional 2-wire line 43. It should be understood that use of echo canceller 20 is not limited to this example, but that echo canceller 20 is also employed in other applications including digital, microwave, and satellite applications.

Echo canceller 20 of FIG. 1 includes a silence detector 50; an adaptive FIR filter 52; a cancellation controller 54; a near-end speech detector 56; a subtractor 58; and, a silence processor 60. Silence detector 50 is connected to receive a signal x(t) on incoming communications path 30 and to generate a "silence detection on input window" signal for application to controller 54 on line 61. FIR filter 52 is connected to operate upon signals forwarded from silence detector 50, and is connected to operate under supervision of controller 54. An echo estimate generated by FIR filter 52 is applied to subtractor 58, which subtracts the echo estimate from the outgoing signal $y_a(t)$ on path 32 to yield a signal e(t). Near-end speech detector 56 is connected to outgoing communications path 32 for monitoring speech occurring at near end 28, and for generating a near-end speech detection signal for application on line 64 to controller 54. The signal e(t) is applied both to controller 54 and silence processor 60. Controller 54 is connected to supervise operation of silence processor 60.

Controller 54 outputs a "silence detection on outgoing signal" signal on line 66 to serve as an indication of silence on outgoing communications path 32. Controller 54 uses the double-talk signal 64 from near-end speech detector 56 to produce the signal on line 66, which is a different signal than the "silence detection on incoming window" signal generated by silence detector 50 on line 61. The signal on line 66 corresponds to silence characteristics of the outgoing signal on path 32 towards far end 26.

Cancellation controller 54 receives a plurality of operator inputs, including a mode input on line 68 and an ENABLE_SUPPRESS input on line 69. The mode input on line 68 specifies whether a calculation reduction mode or an intrusion reduction mode is to be implemented. The ENABLE_SUPPRESS input on line 69 indicates whether silence processor 60 is, in the calculation reduction mode, to suppress any remaining echo after attempted cancellation, or whether noise is to be inserted in the outgoing signal on path 32.

SILENCE DETECTION

In operation, silence detector 50 and near-end speech detector 56 are disabled during the first N samples of signal x(t). The first N samples are required for initial convergence of the adaptive filter upon start-up. The first N samples required for initial convergence ranges for the present invention between 1000 and 5000 samples. Filter convergence is understood by the person skilled in the art, and accordingly not explained herein.

At any given time after convergence, silence detector 50 performs silence detection on speech incoming on path 30 from far end 26. Silence detector 50 takes "samples" of the signal, and then makes a "silence decision" with respect to a predetermined number of consecutive samples (i.e., a "decision window"). For example, using 64 kbit/s speech, one sample lasts 125 $\mu$seconds. Factors involved in setting the length of the decision window are discussed hereinafter. By way of illustration, a decision window of 10 ms at any given time consists in the last 80 samples which have been received. The "silence decision" is made with respect to an entire decision window, not on each individual sample. That is, all samples in a decision window must not exceed a predetermined voiced threshold. Silence detection as performed by silence detector 50 is based on energy levels of the incoming signal x(t) on path 30. A silence energy threshold is used which depends on the maximum noise level expected.

Silence detection as performed by silence detector 50 is used to estimate the silence characteristics of the speech reflected back from the echo source (e.g. hybrid circuit 41 in the twisted-pair communications system of FIG. 2). Silence detector 50 analyzes each decision window for silence, and makes both a present window silence state ["silence(t)"] and a past window silence state ["silence(t−1)"] available to controller 54. These state values, together with the "near-end" or "double-talk" detection signals on line 64, enable controller 54 to make its decision regarding the coefficients of FIR filter 52.

Upon detection of silence (i.e., a decision window in which all samples are below a voiced threshold), controller 54 can operate in either of two modes—a calculation reduction mode or an intrusion reduction mode. An operator specifies by mode input 68 which mode is to be utilized. Briefly, in the calculation reduction mode, when there is no double-talk (1) the previous coefficient values of FIR filter 52 are temporarily stored; (2) the coefficients of FIR filter 52 are set to zero so as to disable FIR filter 52 (i.e. e(t)=$y_a$(t)); (3) silence processor 60 replaces the signals on outgoing path 32 with noise samples for a silence-affected period relative to outgoing data on path 32; and, (4) after the silence-affected period, the stored coefficient values are restored to FIR filter 52. In the intrusion reduction mode, when there is no double-talk the coefficients of FIR filter 52 are frozen and silence processor 60 operates as non-linear processor (e.g., suppresses any remaining amount of echo which FIR filter 52 is unable to cancel during the silence-affected period on path 32). In both modes, no adaptation of the coefficients of FIR filter 52 is performed. The calculation reduction mode is discussed in more detail in connection with FIG. 6 (and an alternative implementation in FIG. 6A); the intrusion reduction mode is discussed in more detail in connection with FIG. 7 (and an alternative implementation in FIG. 7A).

When non-silence windows are seen on incoming communications path 30, echo canceller 20 updates coefficients of FIR filter 52 and subtracts the echo estimate from outgoing signal $y_a$(t). However, the detection of silence on incoming communications path 30 following the non-silent window causes echo canceller 20 to conduct a silence processing operation. In the silence processing operation, the pre-silence coefficient values of filter 52 are stored. During the silence processing operation, the content of the outgoing communications signal on path 32 to far end 26 is, for the silence-affected period, obtained without updating of the filter coefficients (and, moreover, in the calculation reduction mode, without use of the filter coefficients). When a non-silence window follows a silence window, pre-silence coefficient values of the filter are restored.

DETERMINATION OF SILENCE-AFFECTED PERIOD

The determination of the silence-affected period on outgoing communications path 32 depends upon the length of the decision window relative to the length of an echo path pure delay. The silence decision window is set by the operator depending on the amount of silence detection efficiency required. The echo path pure delay is a measurement of the time taken for a signal to be reflected back to its source. In the example of FIG. 2, for example, the echo path pure delay is the time required for a signal applied by its source to wire 42A to travel to hybrid 41 and be reflected back on wire 42B to its source. The echo path pure delay is either known or may be set automatically. One technique for determining echo path pure delay is illustrated in U.S. Pat. No. 4,736,414, incorporated herein by reference. Another technique for determining echo path pure delay is described in U.S. patent application Ser. No. (attorney docket: 1410-211) filed simultaneously herewith by Karim El Malki, entitled "ECHO PATH DELAY ESTIMATION" and incorporated herein by reference.

As explained in more detail herein, there are two cases for determining the silence-affected period—a short echo delay case (wherein the decision "window" on which the silence decision is taken is greater than the round-trip delay to the echo source) and a long echo delay case (wherein the decision "window" on which the silence decision is taken is shorter than the round-trip delay to the echo source).

Figure 10:
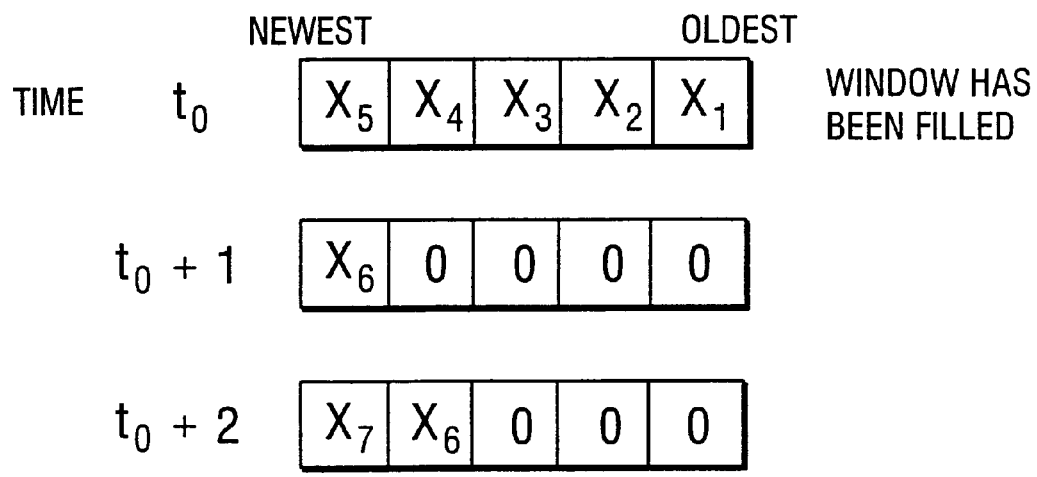
FIG. 10 is a schematic diagram illustrating assembling of samples into non-overlapping windows.

Moreover, for each of the short echo delay case and the long echo delay case there are two implementations—an overlapping window determination and a non-overlapping window determination. As indicated previously, silence detector 50 takes "samples" of the signal x(t), and then makes a "silence decision" with respect to a predetermined number of consecutive samples (i.e., a "decision window"). FIG. 10 illustrates assembling of samples into non-overlapping windows. Assume in FIG. 10 that, at time $t_0$, samples $x_1$ through $x_5$ are included in a first decision window (the decision window having a length of five samples for sake of illustration). In the non-overlapping window implementation, a silence decision is made with respect to the window at time $t_0$, and then the entire window is flushed to contain zeros. At time $t_0$+1, a second decision window begins to fill with sample $x_6$. Then, at $t_0$+1, the second decision window receives sample $x_7$. Filling of the second window continues in like manner until the entire second window is filled with samples (i.e., samples $x_6$ through $x_{10}$) at $t_0$+5. Then, after the filling of the second window at $t_0$+5, a silence decision is made with respect to the entire second window.

Figure 11:
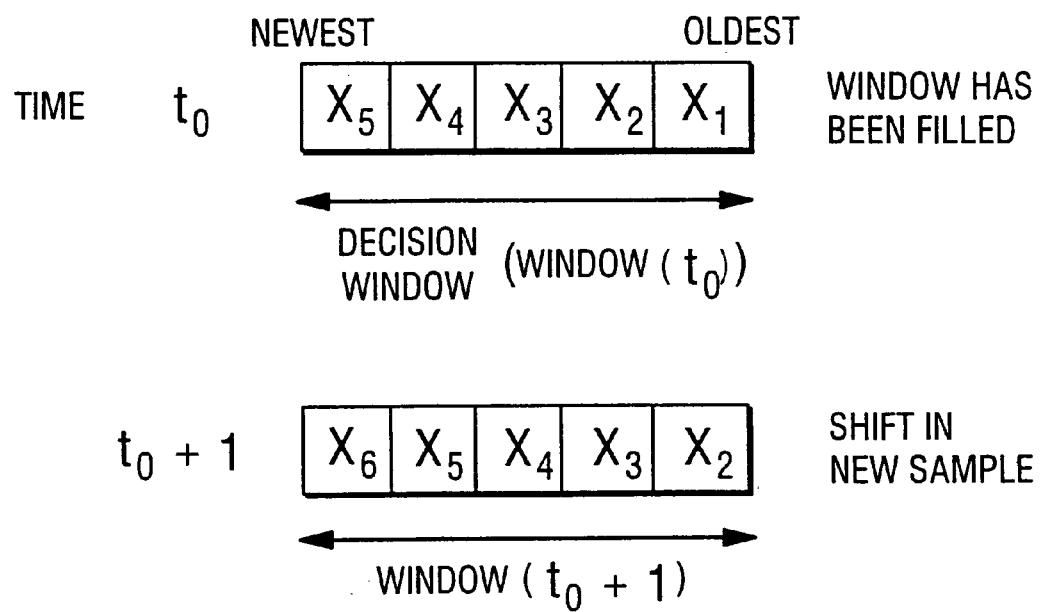
FIG. 11 is a schematic diagram illustrating assembling of samples into overlapping windows.

Whereas FIG. 10 illustrates assembling of samples into non-overlapping windows, FIG. 11 illustrates assembling of samples into overlapping windows. In the overlapping window implementation of FIG. 11, it is assumed that at time $t_0$ samples $x_1$ through $x_5$ are included in a first decision window (the decision window again having a length of five samples for sake of illustration). At time $t_0+1$, a new sample $x_6$ is received, whereupon at time $t_0+1$ a second decision window constituted by samples $x_2$ through $x_6$ is formed. A silence decision is then made at time $t_0+1$ with respect to this second decision window. Similarly, at subsequent times $t_0+2$, $t_0+3$, etc., further decision windows are formed and evaluated for silence.

Figure 4:
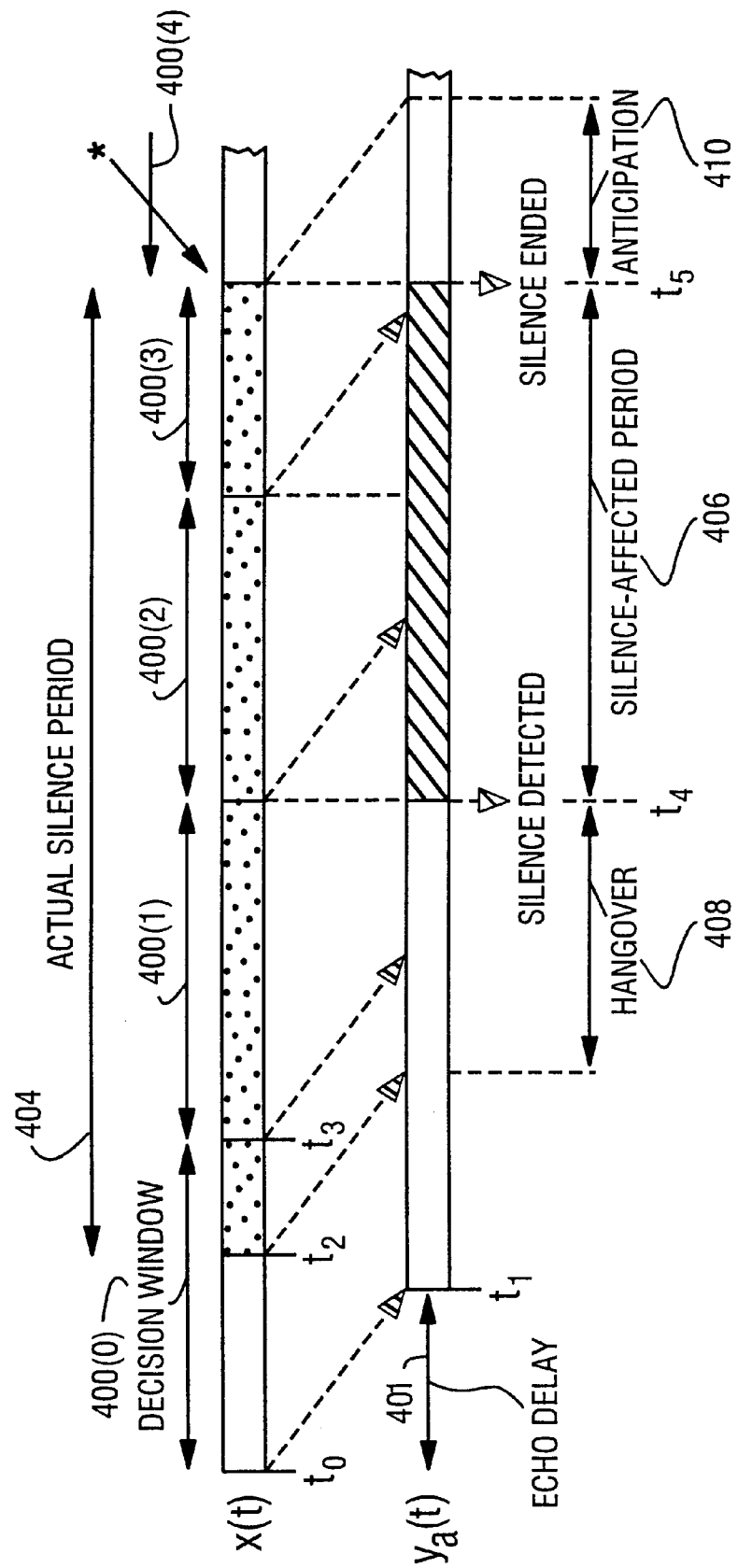
FIG. 4 is a diagrammatic view of a window-based silence detection method when echo path delay is shorter than a decision window using a non-overlapping window implementation.

FIG. 4 illustrates determining the silence-affected period for the short echo delay case in the non-overlapping window implementation. In this case the decision "window" on which the silence decision is taken is greater than the round-trip delay to the echo source. In FIG. 4, x(t) represents the incoming signal on path 30. The signal x(t) is evaluated for silence in a series of decision windows 400(0), 400(1), . . . 400(4). The echo path delay 401 is shown as being shorter than the nominal decision window. Decision window 400(0) begins at time to and ends at time $t_3$. The reflection of signal $x(t_0)$ begins on path 32 at time $t_1$.

FIG. 4 shows an actual silence period 404 which begins at time $t_2$ and continues until time $t_5$. It is a criteria of silence detector 50 that the beginning of an actual silence period can be declared only after silence has been detected throughout an entire decision window. Accordingly, it is not until time $t_4$ that silence detector 50 declares the existence of silence on path 30. Such declaration begins (at time $t_4$) the silence-affected period 406 in signal $y_a(t)$ on path 32. FIG. 4 further shows that silence is also detected through the entirety of decision window 400(2), but only for a portion of decision window 400(3). In fact, at time $t_5$ silence detector 50 detects non-silence. If the actual silence period ends at a time which does not correspond to a window boundary, the window is immediately terminated and a new window (i.e., window 400(4) in FIG. 4) commences from this point (e.g., time $t_5$).

In this short echo delay case, a "hangover" period 408 is introduced at the beginning of the actual silence period 404 and prior to the affected-silence period 406. The "hangover" period eliminates erroneous silence detection during short pauses such as inter-syllable pauses. The size of the decision window will therefore determine the efficiency of the silence detection.

In the above regard, inter-syllable pauses range from about 100 ms to about 200 ms. If a decision window of less than 100 ms is chosen, then most inter-syllable pauses are detected, making the algorithm more efficient. In such case, the echo path pure delay should be less than the length of the decision window chosen for proper operation. For example, choosing a decision window of 10 ms would only work for echo path pure delays below 10 ms. If a decision window of 100 ms and above were chosen, then the algorithm will be less sensitive to pauses and therefore less efficient.

In the case illustrated in FIG. 4, the silence-affected period 406 is entered later and ended earlier than the silence characteristics of the returning signal $y_a(t)$. The silence-affected period 406 is entered later by the time of HANGOVER 408 shown in FIG. 4 and is ended later by an amount labeled ANTICIPATION 410 shown in FIG. 4. This provides for an in-built hangover and anticipation mechanism which allows for a correct detection of silence. The filter coefficients are therefore adapted at the beginning and end of the actual silence period 404 to account for possible "unvoiced" letters and inter-syllable pauses, which might be mistaken for silence.

FIG. 5 illustrates determining the silence-affected period for the long echo delay case in the non-overlapping window implementation. In this case the decision window on which the silence decision is taken is shorter than the round-trip delay to the echo source. In FIG. 5, x(t) again represents the incoming signal on path 30. FIG. 5 also shows a series of decision windows 500(0), 500(1), . . . 500(7) in which the signal x(t) is evaluated for silence. The echo path pure delay 501 is shown as being longer than the nominal decision window. Decision window 500(0) begins at time $t_0$ and ends at time $t_2$. The reflection of signal $x(t_0)$ begins on path 32 at time $t_3$.

FIG. 5 shows an actual silence period 504 which begins at time $t_1$ and continues until time $t_6$. Again, it is a criteria of silence detector 50 that the beginning of an actual silence period can be declared only after silence has been detected throughout an entire decision window. Accordingly, it is not until time $t_3$ that silence detector 50 declares the existence of silence on path 30. Unlike the short echo delay case described above, a existence of silence on path 30 does not automatically begin the silence-affected period 506 on path 32. Rather, the silence-affected period 506 on path 32 is not begun until the signal $x(t_3)$ is reflected as signal $y_a(t_5)$ on path 32. Thus, the silence-affected period 506 begins at time $t_5$.

FIG. 5 further shows that silence is also detected through the entirety of decision windows 500(2) and 500(3), but only for a portion of decision window 500(4). In fact, at time $t_6$ silence detector 50 detects non-silence. As in the short echo delay case, if the actual silence period ends at a time which does not correspond to a window boundary, the window is immediately terminated and a new window (i.e., window 500(5) in FIG. 5) commences from this point (e.g., time $t_6$).

The silence-affected period 506 is terminated at a predetermined anticipation interval 510 prior to a point in the signal $y_a(t)$ on the outgoing communication path 32 which corresponds to cessation of the actual silence period 504 in the signal x(t) on the incoming communication path 30. As shown in FIG. 5, the silence-affected period 506 ends at time $t_8$. Signal $y_a(t_9)$ includes the reflection of signal $x(t_6)$. However, after determining that signal $x(t_6)$ has its reflection on path 32 at time $t_9$, controller 54 shortens the silence-affected period 506 by the predetermined anticipation interval 510, thereby ending the silence-affected period 506 at time $t_8$.

As mentioned previously, for large echo path pure delays the technique of the short echo delay case would make the algorithm insensitive to silence and therefore less efficient. In contrast, the long echo delay case requires the silence detection to be synchronized with the speech returning on path 32 after being reflected backwards. Therefore, in this long echo delay case the decision window is smaller than the round-trip delay, and depends only on the efficiency in silence detection required. For good efficiency the window should be much smaller than the echo path pure delay. In the situation illustrated in FIG. 5, the decision window is chosen to be half of the echo path pure delay 501. The echo path pure delay is then used as synchronization delay such that the silence detection results match to the returning speech.

In this long echo delay case, the silence-affected period 506 is entered at the end of the first fully silent window (e.g., window 500(1)) and filter coefficient updating is started early due to the anticipation interval 510. The anticipation interval 510 has a length which is equal to (DWL/F), where F is a constant. "DWL" is the Decision Window Length; i.e., the nominal length of the decision window 500(0), 500(1), etc.

The constant F preferably ranges from 3 to 10. These characteristics provide the long echo delay case with silence detection results similar to those of the short echo delay case.

Figure 4A:
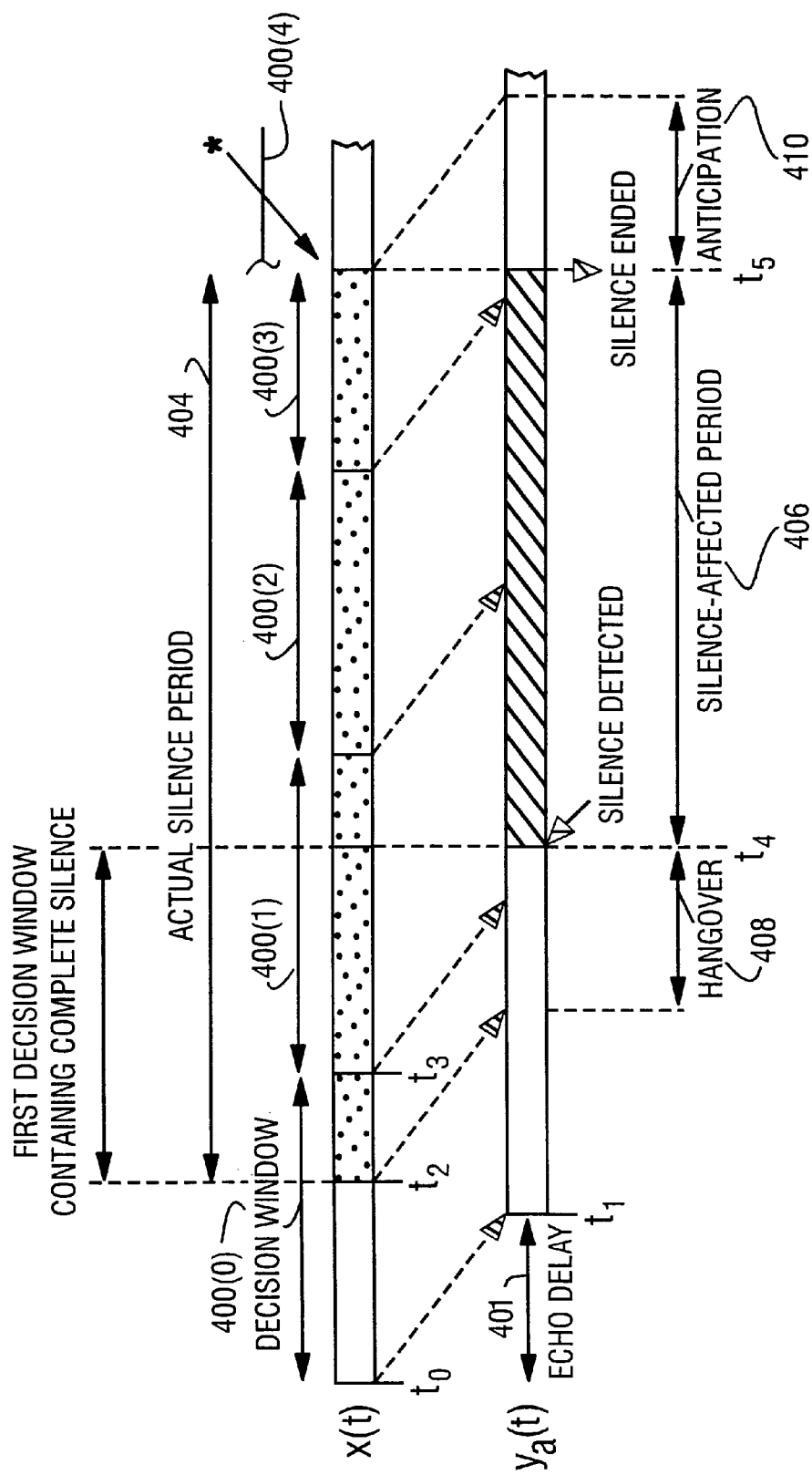
FIG. 4A is a diagrammatic view of a window-based silence detection method when echo path delay is shorter than a decision window using an overlapping window implementation.
Figure 5A:
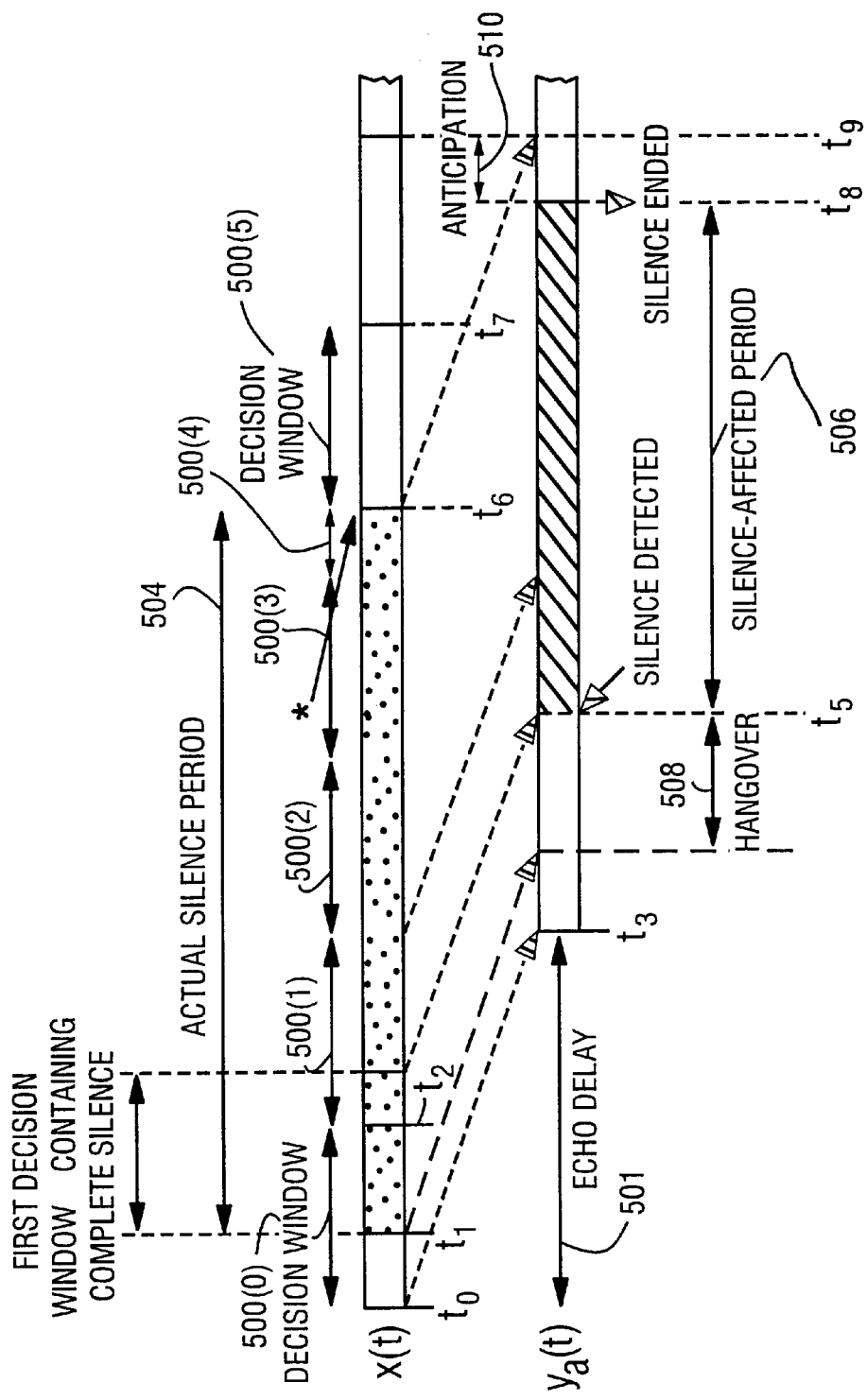
FIG. 5A is a diagrammatic view of a window-based silence detection method when echo path delay is longer than a decision window using an overlapping window implementation.

Whereas FIG. 4 illustrates determining the silence-affected period for the short echo delay case in the non-overlapping window implementation and FIG. 5 illustrates determining the silence-affected period for the long echo delay case in the non-overlapping window implementation, FIG. 4A illustrates determining the silence-affected period for the short echo delay case in the overlapping window implementation and FIG. 5A illustrates determining the silence-affected period for the long echo delay case in the overlapping window implementation. It should be understood from these drawings that the overlapping window implementation is more responsive to detect silence conditions in view of the increased frequency of window formation and evaluation.

The value which marks the boundary between the short echo delay case (of FIG. 4 or FIG. 4A) and the long echo delay case (of FIG. 5 or FIG. 5A) depends upon the decision window size and the echo path pure delay, and should be set depending on the efficiency required. The operator should set the decision window size value for echo canceller 20. As mentioned previously, a small window achieves increased efficiency in silence detection and therefore increased computational gains. Also, it is assumed here that the echo path pure delay has either been set by the operator or determined automatically. For example, given that the size for the decision window is set to 64 ms, if the echo path pure delay is above 64 ms, then the long echo delay case (of FIG. 5 or FIG. 5A) should be chosen. Otherwise, the short echo delay case (of FIG. 4 or FIG. 4A) is chosen.

It should be noted that, in normal terrestrial communication, a round-trip delay of more than 64 ms is not normally expected to be exceeded. Therefore, by setting the decision window to 64 ms, the short echo delay case of FIG. 4 should be enabled for such communication. This is assuming that the operator accepts the efficiency of a decision window size of 64 ms. Given this, if the operator is able to determine that the type of communication has a relatively low delay (e.g. terrestrial POTS to POTS), the short echo delay case of FIG. 4 or FIG. 4A may be automatically set without performing echo path delay settings. However, with Codecs (such as those used in mobile communications) this delay will be exceeded, and the long echo delay case of FIG. 5 would be required together with the echo path pure delay setting. On the other hand, if maximum efficiency is required, and therefore a small decision window is chosen (e.g. 10 ms), the echo path pure delay must be either set or be determined automatically in order to determine which case is applicable.

ECHO CANCELLATION

Now that it has been described how the timing and duration of the silence-affected period on the outgoing signal $y_a(t)$ is determined, discussion returns to how echo canceller 20 influences the signal outgoing on path 32. As mentioned above, echo canceller 20 can operate in either of two modes—a calculation reduction mode or an intrusion reduction mode.

Figure 6:
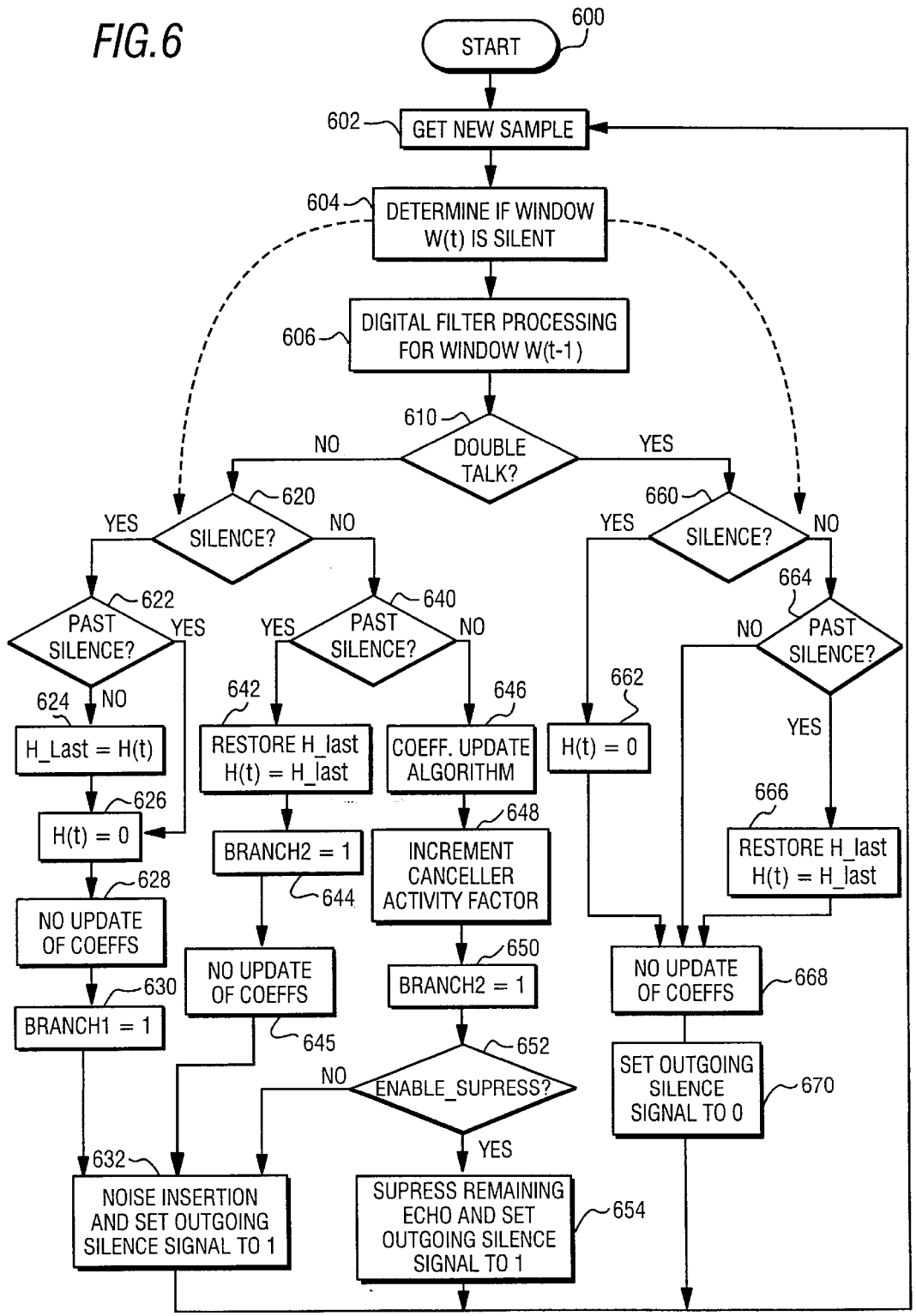
FIG. 6 is a flowchart of steps conducted by an echo canceller of the invention in a first implementation of a calculation reduction mode.

The actual operation of the silence-improved echo canceller 20 of the present invention is controlled by instructions executed by cancellation controller 54. Steps involved in execution of the calculation reduction mode are shown in FIG. 6 (and an alternative implementation in FIG. 6A); steps involved in execution of the intrusion reduction mode are shown in FIG. 7 (and an alternative implementation in FIG. 7A). In the methods herein illustrated, operation is with respect to linearly coded input signals x(t) and $y_a(t)$. For example, PCM 64 kbit/s speech is compressed using the well-known m-Law or A-law. Expansion and compression of this coded speech is a simple operation and is assumed to be performed at the inputs and outputs of echo canceller 20. Expansion and compression is understood by the person skilled in the art.

In connection with the use of FIG. 6 and FIG. 7 (and the respective alternative implementations of FIG. 6A and FIG. 7A) to describe the implementation of these instructions, the following parameters (e.g., variables) are employed:

H(t): Current Filter coefficients (at time t)

H__last: Storage of last update of Filter coefficients before silence has been detected.

k: Loop counter variable incremented after traversing the algorithm.

Silence (t): Silence boolean variable containing information on the presence of speech or silence at the current window time (time t).

Silence(t−1): Silence boolean variable containing information on the presence of speech or silence at the previous window time (time t−1).

It should be understood that the Silence boolean variable refers to the window-based silence detection procedure described above. During the first N samples, the Silence boolean variable is set continuously to zero (i.e. not silence) to allow for the initial convergence.

The following definitions also apply to the steps shown in FIG. 6 and FIG. 7 (and the respective alternative implementations of FIG. 6A and FIG. 7A):

Past Silence=(Silence(t−1)&&(branch2==1)&& (branch1==1)) or k==0

Past Silence will be true during the first iteration. Then it will only be true if a silence condition was detected at the previous time window and if the two "silence" branches of the flowchart have already been traversed at least once.

Double Talk: The status of the signal on line 64 from near-end speech detector 56.

Canceller Activity factor: A counter of the number of samples on which the canceller has been active.

This value may be necessary for the management of the echo canceller 20.

CALCULATION REDUCTION MODE— DELAYED SILENCE IMPLEMENTATION

In the calculation reduction mode, maximum reduction in computational complexity is achieved. This is because adaptive FIR filter 52 does not operate (i.e. no multiplications between filter coefficients and input signal are performed) during periods in which the window-based silence detection mechanism detects silence. In the calculation reduction mode, silence processor 60 replaces this silence with noise samples. Also, in the calculation reduction mode, the values of the coefficients before silence is detected are stored, such that they may be retrieved for use when the silent period ends.

Steps executed in a first or "delayed silence" implementation of the calculation reduction mode are shown in FIG. 6. Step 600 of FIG. 6 represents the start of operation of echo canceller 20 using the calculation reduction mode. At step 600, various initializations occur, including initializations of flags "branch1" and "branch2" (initialized to zero).

After start-up (and after convergence), at step 602 silence detector 50 obtains a new sample of the signal x(t) on incoming communications path 30. Then, at step 604, silence detector 50 shifts the sample obtained in step 602 into a decision window W(t) which also includes a predetermined number of previous consecutive samples. At step 604 silence detector 50 evaluates the decision window W(t) to determine if the energy level for every sample included therein is below a predetermined voiced threshold. If all samples in the decision window W(t) are below the voiced threshold, decision window W(t) is denominated as being "silent" or having "silence". If "silence" is detected for decision window W(t), the boolean parameter Silence(t) is set to "1". Moreover, at step 602, the value to the boolean variable "Silence" for decision window W(t−1) is stored in boolean parameter Silence(t−1).

Although the foregoing and ensuing descriptions of step 602 involve an overlapping window implementation (see FIG. 11), it should be understood that an non-overlapping window implementation (see FIG. 10) can easily alternatively be implemented. In a non-overlapping window implementation, step 602 would involve waiting for a number of samples of signal x(t) equal to the length of the decision window prior to conducting the silence determination of step 604. In such manner, no sample would be part of more than one decision window. Of course, samples are serially shifted through the buffer of FIR filter 52, in the manner explained for example in U.S. patent application Ser. No. 08/725,655 filed simultaneously by Karim El Malki, entitled "ECHO PATH DELAY ESTIMATION" and incorporated herein by reference.

At step 606, digital filter processing is performed, the digital processing normally being performed with respect to window W(t−1). Digital filter processing involves the multiplication (when required) using the coefficients of FIR filter 52, modified in relation to receipt of decision window W(t−1), to obtain the estimate of the echo, and subtraction by subtractor 58 of the echo estimate from signal $y_a(t)$. It should be understood, however, that should all coefficients of FIR filter 52 be set to zero (as could occur with respect to steps 626 and 662 hereinafter described), no digital filter processing is performed at step 606. When all coefficients of FIR filter 52 are zero, operation at step 606 merely involves feeding signal $y_a(t)$ through to path 32 as signal e(t).

Thus, the adaptive digital filtering performed by echo canceller 20 of the present invention is basically a delayed adaptive filtering. That is, the digital processing performed at time t utilizes filter coefficients as modified based on receipt of decision window W(t−1). As will be seen hereinafter, however, upon receipt of a decision window W(t) with silence and when there is no double talk, echo canceller 20 does not wait until time t+1 in order to influence the outgoing signal $y_a(t)$ on communications path 32, but instead modifies the outgoing signal $y_a(t)$ during time t as hereinafter described.

At step 610, echo controller 54 checks whether the signal on line 64 from near-end speech detector 56 indicates "double talk". If double-talk (i.e., speech at near end 28) is not detected, execution continues at step 620. If double-talk is detected at step 610, execution continues with step 660.

If double talk is not detected at step 610, at step 620 controller 54 checks the results of step 604 to determine whether the window most recently formed by receipt of the sample obtained at step 602 was a silent window (i.e., whether "silence" was detected throughout the detection window). If silence is determined at step 620, controller 54 executes a first branch of operations comprising even numbered steps 622–632. This first branch of operations is represented by the flag branch1. If silence is not determined at step 620, a second branch of code operations comprising step 640, various ones of even numbered steps 642–654 and possibly 632 are executed. This second branch of operations is represented by the flag branch2. Upon completion of either the first branch and second branch, processing returns to step 602 for the fetching of another window.

If double-talk is detected at step 610, execution continues with step 660. At step 660 an inquiry is made whether the window most recently obtained at step 602 contained silence (throughout). If the most recently obtained window did contain silence, a third branch of FIG. 6 comprising step 662 is executed prior to executing steps 668 and 670. On the other hand, if the most recently obtained window did not contain silence, a fourth branch of FIG. 6 comprising steps 664 and 666 are executed prior to executing steps 668 and 670. Upon completion of step 670, processing returns to step 602 for the fetching of another window.

Assume that a window W(m) is obtained at step 602 as the result of receipt of a new sample. Assume further that it is determined at step 604 that window W(m) does not contain silence (i.e., is not entirely silent throughout), that it was determined at a previous execution of step 604 that window W(m−1) was not silent, and that at step 610 there is no detection of double-talk. At step 606 digital filter processing occurs with the coefficients of FIR filter 52 having been modified in accordance with receipt of window W(m−1).

In view of the absence of double talk for window W(m), step 620 is executed to check whether window W(m) was determined to be silent. Since window W(m) is not silent, branch two beginning at step 640 of FIG. 6 is then executed. Since there was no past silence in the prior window W(m−1), even numbered steps 646–654 are executed. At step 646, the coefficients of adaptive FIR filter 52 are updated under supervision of cancellation controller 54. Then, at step 648, the Canceller Activity Factor is incremented (for indicating the number of samples on which echo canceller 20 has been active). At step 650 the flag branch2 is set to "1" to indicate that the second branch has been executed. Then, at step 652, a check is made whether the flag ENABLE_SUPPRESS has been set by operator input on line 69. If input ENABLE_SUPPRESS has been set, at step 654 silence processor 60 attempts to suppress any remaining echo on path 32. If input ENABLE_SUPPRESS has not been set, at step 632 silence processor 60 is instructed by controller 54 to replace the outgoing signal e(t) on communications path 32 with noise generated by processor 60 for the silence-affected period. Also at step 632 and step 654, controller 54 sets its "silence signal on outgoing signal" signal on line 66 to "1". Noise replacement occurs at step 632 since in correct echo cancellation the signal e(t) should be down to the level of noise.

After execution of either step 654 or step 632, execution returns to step 602 for fetching another sample so that window W(m+1) can be constructed and examined at step 604. Then, at step 606, digital filter processing is performed. The multiplication involved in the processing performed at step 606 at this juncture uses filter coefficients as updated at the last execution of step 646.

Suppose that the window W(m+1) obtained at step 602 does contain total silence, and that double-talk is not occurring. The first branch of FIG. 6 is executed, beginning with step 622. Since it was be determined at step 622 that window W(m) did not contain silence, step 624 is executed prior to execution of step 626. At step 624 the current coefficients of adaptive FIR filter 52 are stored at location H_last. Then, at step 626, the coefficients of adaptive FIR filter 52 are all set to zero. As indicated by step 628, no update or adaptation of the FIR filter 52's coefficients is performed for the window W(m+1). Instead, at step 632 silence processor 60 inserts noise at the appropriate time on the outgoing signal on path 32. In addition, at step 632 controller 54 sets the status of line 66 to indicate that silence is outgoing on path 32. At step 630, the flag branch1 is set to "1" to indicate that the first branch has been executed. After execution of the first branch (which occurred for the window W(m+1) of the present illustration), execution returns to step 602 for the fetching of another sample and the formation at step 604 of window W(m+2). After receipt of the sample that results in formation of window W(m+2), digital filter processing at step 606 involves only subtraction without multiplication since the coefficients of the digital FIR filter 52 were set to zero at step 626.

Assume that window W(m+2) also contains total silence, and that no double-talk occurs. Branch one of FIG. 6 is again executed, in like manner as with window W(m+1) except for the fact that step 624 is not executed. In this regard, in connection with step 622 it will be noted that flag Past Silence is set. That is, at this juncture, silence was detected for the window W(m+1) (therefore, the boolean variable "Silence(t−1)" is true) and both flags branch1 and branch2 have been set to "1". Thus, there is no change of the filter coefficients (which remain at zero) and again insertion of noise (step 632) on the outgoing path 32.

Upon receipt of another sample, suppose that window W(m+3) obtained at step 602 does contain speech and there is no double-talk. The second branch of FIG. 6 will be executed. Since the flag "Past Silence" is still set, steps 642, 644, and 645 are executed. At step 642 the values stored (at step 624) in location H_last are obtained and assigned to array H(t), the array of the current coefficients of adaptive FIR filter 52. At step 644, flag branch2 is set to "1". Step 645 indicates that there is no update of the coefficients of FIR filter 52. Then, at step 632 silence processor 60 is instructed by controller 54 to insert noise on path 32 in the silence-affected period and controller 54 sets its "silence detected on outgoing signal" signal on line 66 to "1". Execution then returns to step 602 for fetching of another sample.

Upon receipt of another sample, assume that window W(m+4) does not contain total silence (i.e., there is speech), and that double-talk is not occurring. At step 606, the digital filter processing occurs with respect to the restored coefficients (i.e., those coefficients restored at the last execution of step 642). Again the second branch of FIG. 6 is executed, but this time even numbered steps 646 through 652 and either step 654 or step 632 are executed. At step 646 the coefficients of FIR filter 52 are updated under supervision of controller 54. At step 648 the Canceler Activity Factor is incremented. Flag branch2 is kept at "1" (step 650). At step 654 silence processor 60 attempts to suppress any remaining echo on path 32 and sets the outgoing silence signal on line 66 to "1".

Execution then returns to step 602 for receipt of another sample. During the next execution of step 606, digital filter processing will occur with the coefficients of FIR filter 52 being those which were updated during the last execution of step 646.

Suppose that, as an alternative to what was assumed previously, that the window W(m+3) did contain silence and the near-end speech detector 56 did detect speech from near end 28. In such case, echo controller 54 receives a double-talk signal on line 64, which prompts execution of branch three of FIG. 6. At step 662, the coefficients of adaptive FIR filter 52 are set to zero by controller 54. As indicated by step 668, no updating of coefficients is performed. At step 670, the "silence detection on outgoing signal" signal on line 66 is set to zero.

Suppose further that, subsequent to the processing of the window W(m+3) as immediately described above, a new sample is obtained at step 602, resulting in formation of window W(m+4) at step 604. Assume further that window W(m+4) is detected as not having silence. In view of the filter coefficients having been set to zero at step 662, no digital filter multiplication is performed at step 606 (only digital filter subtraction is performed). The fourth branch of FIG. 6 is executed for window W(m+4). At step 664, it is determined that the previous window (the window W(m+3) immediately described above) did contain total silence, so that step 666 is executed. At step 666 the filter coefficient values stored at location H_Last are restored as the current filter coefficients. There is no updating of coefficients in accordance with the incoming signal (step 668), and the "silence detection on outgoing signal" signal on line 66 remains at zero (step 670). Thus, the next execution of digital filter processing at step 606 will involve multiplication using the coefficients restored at step 666.

Suppose that a window W(m+5) follows the window W(m+4) immediately described above, and that (like the window W(m+4)) silence is not detected but double-talk is detected. Since the flag "Past Silence" is not true (since window W(m+4) was not silent), steps 668 and 670 are executed. Since the filter coefficients are not updated (as reflected by step 668), the next execution of digital filter processing at step 606 involves the same filter coefficients as were involved during the previous execution of step 606 (as described in the preceding paragraph).

In the scenario immediately described above, filter coefficient adaptation by controller 54 is not invoked until near-end speech detector 56 again detects an absence of speech emanating from far end 28, and there is both an absence of silence and an absence of past silence. Suppression of echo canceller 20 by reason of silence detection does occurs during execution of the first branch, which requires detection of total silence in the most recently obtained window.

In connection with step 632 of FIG. 6, the level of noise inserted is determined using any of several techniques known to those skilled in the art, such by signalling during the start-up of the connection given by the transmitter, or by taking an estimate during the first windows of the "silent" period. Using the latter technique, the noise level detection is made adaptive.

CALCULATION REDUCTION MODE NON-DELAYED SILENCE IMPLEMENTATION

Figure 6A:
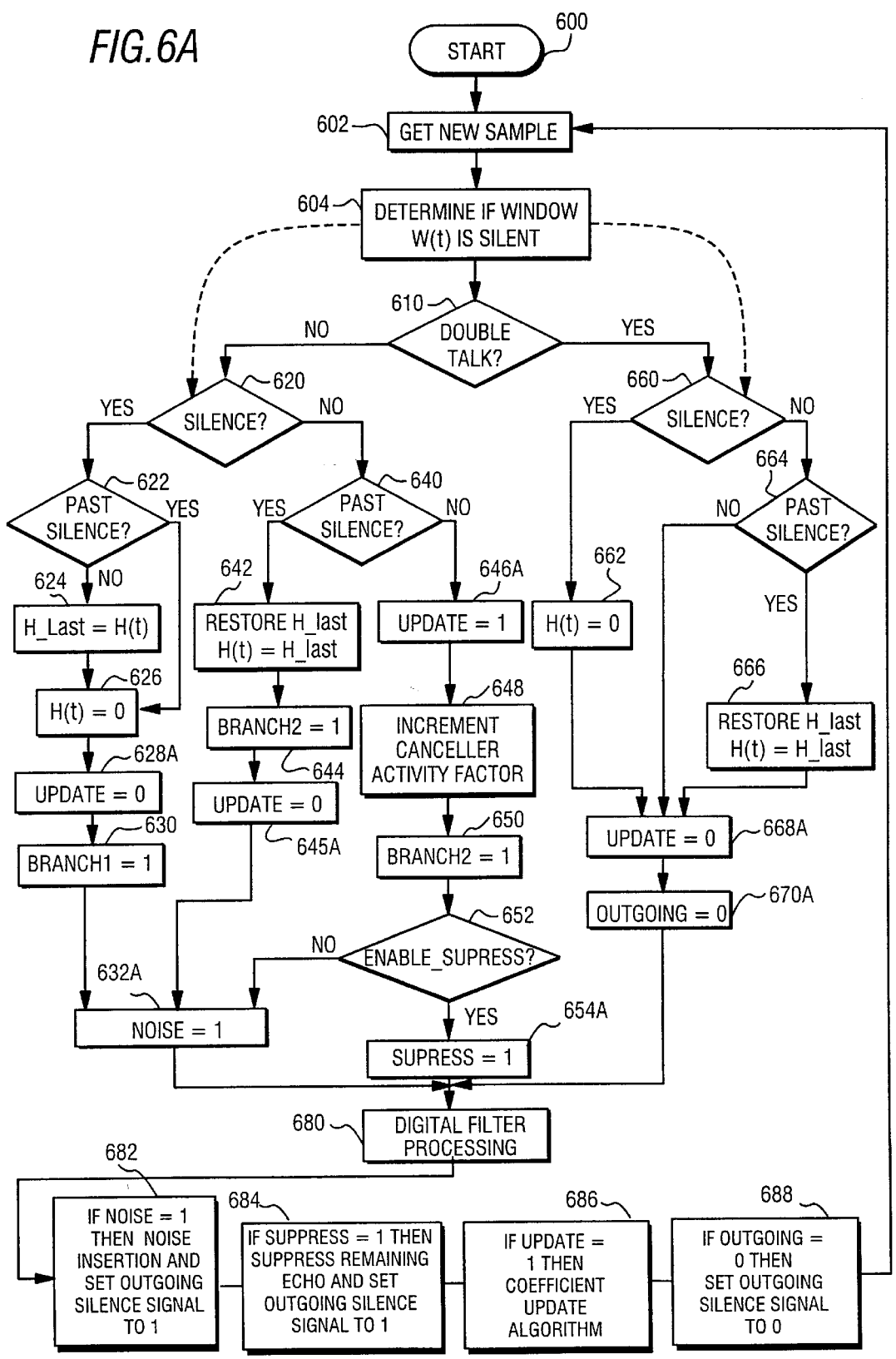
FIG. 6A is a flowchart of steps conducted by an echo canceller of the invention in an alternate implementation of a calculation reduction mode.
Figure 7:
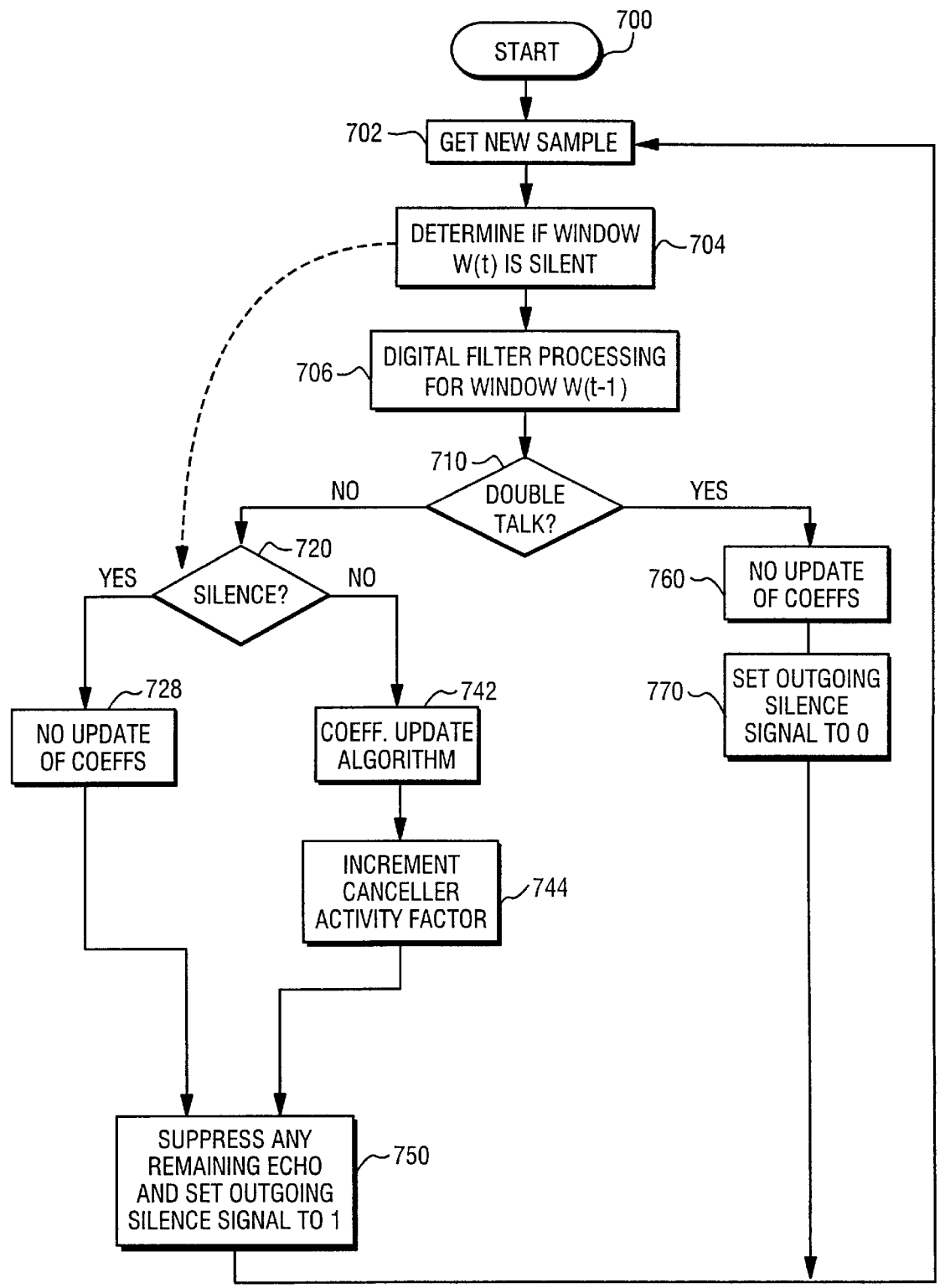
FIG. 7 is a flowchart of steps conducted by an echo canceller of the invention in a first implementation of an intrusion reduction mode.

Steps executed in an alternative or "non-delayed silence" implementation of the calculation reduction mode are shown in FIG. 6A. As explained in more detail below, the implementation of FIG. 6A basically differs from FIG. 6 in relocation of the digital filter processing step, the use of special flags, and flag-dependent actions undertaken upon completion of the digital filter processing step.

The "non-delayed silence" implementation of FIG. 6A allows a determination of the beginning of the silence-affected period (either period 406 in FIG. 4 or period 506 in FIG. 5) to commence one sample earlier than would otherwise occur in the "delayed silence" implementation. In the "delayed silence" implementation of FIG. 6, silence detection step 604 is performed as the current sample obtained at time t forms window W(t). However, in FIG. 6 the digital filter processing step 606 is performed according to the silence detection on window W(t−1). That is, another sample must be obtained before digital filter processing takes into consideration the consequences of silence detection for window W(t).

In the FIG. 6A implementation, on the other hand, when silence is detected for window W(t), the digital filter processing of step 680 is performed—prior to receipt of another sample—to take into consideration the consequences of silence detection for window W(t). This results in a one sample advancement (as compared to FIG. 6) in the determination of the timing of the beginning of the silence-affected period.

Steps in FIG. 6A that are identical to those of FIG. 6 are identically numbered. In contrast to FIG. 6, in the FIG. 6A implementation step 606 has been removed and, in lieu thereof, step 680 has been added so that step 680 follows each of the four branches. FIG. 6A also shows various "flag" steps which are suffixed with the letter "A" and which otherwise have step numbers corresponding to un-suffixed steps of FIG. 6.

The flags employed in FIG. 6A are a NOISE flag; a SUPPRESS flag; and UPDATE flag; and an OUTGOING flag. When the implementation of FIG. 6A determines that noise is to be inserted, flag NOISE is set to "1".Similarly, when any remaining echo is to be suppressed, flag SUPPRESS is set to "1". If the outgoing silence detected signal on line 66 is to be set to "1", flag OUTGOING is set to "1". Flags NOISE and SUPPRESS are reset to "0" and flag OUTGOING is reset to "1" upon obtaining each new sample at step 602. If filter coefficients are to be updated, flag "UPDATE" is set to "1".

Thus, in contrast to the implementation of FIG. 6, the FIG. 6A implementation does not have a step 646 for updating the filter coefficients, but rather a step 646A in which the flag UPDATE is set to "1". Similarly, in lieu of steps 628, 645, and 668 of FIG. 6, FIG. 6A has the flag setting steps 628A, 645A, and 668A. In the same manner, FIG. 6A does not have a noise insertion step 632 and a suppress remaining echo step 654, but rather respective steps 632A and 654A for setting flags NOISE and SUPPRESS.

Step 680 of FIG. 6A is the digital filtering processing step, which is executed upon completion of the either of the flag-setting steps 632A, 654A, or 670A. After the filter processing of step 680, appropriate ones of steps 682, 684, 686, and 688 are executed. At step 682, noise is inserted and the outgoing silence signal is set to "1" if the flag NOISE has been set to "1". At step 684, if flag SUPPRESS has been set to "1", silence processor 60 suppresses any remaining echo and the outgoing silence signal is set to "1". At step 686, if flag UPDATE has been set to "1", the coefficients of the FIR filter 52 are updated. At step 688, if flag OUTGOING has been set to "0", then the outgoing silence signal is set to "0".

Thus, in the FIG. 6A implementation, output actions (e.g., the setting of the outgoing silence signal, insertion of noise, suppression of any remaining echo) as well as potential coefficient update occur after digital filter processing step 680. However, in view of the fact that digital filter processing step 680 occurs prior to receipt of a next sample, silence detection is advanced by one sample relative to the delayed silence implementation of FIG. 6.

INTRUSION REDUCTION MODE—DELAYED SILENCE IMPLEMENTATION

In the intrusion reduction mode, adaptive FIR filter 52 continues operation, although maintaining its coefficients frozen during silence periods. In the intrusion reduction mode, silence processor 60 suppresses any remaining amount of echo which FIR filter 52 is unable to cancel.

Steps executed in a first or "delayed silence" implementation of the intrusion reduction mode are shown in FIG. 7. At step 700 of FIG. 7 represents the start of operation of echo canceller 20 using the intrusion reduction mode. At step 700, various initializations occur. After start-up (and after convergence), at step 702 silence detector 50 obtains a new sample from signal x(t)) on incoming communications path 30.

Steps 704 and 706 are analogous to steps 604 and 606 of FIG. 6. In particular, at step 704 silence detector 50 determines whether a window W(t) just formed by shifting in the newly received (at step 702) sample for time t is a silent window. At step 706, digital filter processing is performed when appropriate, any digital filter processing again involving filter coefficients modified to reflect receipt of window W(t−1).

At step 710, echo controller 54 checks whether the signal on line 64 from near-end speech detector 56 indicates "double talk". If double-talk (i.e., speech at near end 28 ) is not detected, execution continues at step 720. If double-talk is detected at step 710, execution continues with step 760.

If double talk is not detected at step 710, at step 720 controller 54 checks the results of step 704 to ascertain whether the window most recently obtained at step 702 was a silent window (i.e., whether "silence" was detected throughout the detection window). If silence was detected at step 720, controller 54 does not update the coefficients of adaptive FIR filter 52 (step 728) and then executes step 750. At step 750, controller 54 enables silence processor 60 so that silence processor 60 attempts to suppress any echo occurring in the signal on path 32. Also, at step 750, controller 54 sets its "silence detection on outgoing signal" signal on line 66 to "1".

If silence was not ascertained at step 720, controller 54 updates the coefficients of adaptive FIR filter 52 (step 742) and then increments the Canceller Activity Factor counter (step 744). Step 750 is then executed, so that e.g., controller 54 enables silence processor 60 so that silence processor 60 attempts to suppress any remaining echo which has not been cancelled.

If double-talk is detected at step 710 by near-end speech detector 56, there is no updating of the coefficients of adaptive FIR filter 52 (step 760). Controller 54 sets the speech detection signal on line 64 to zero (step 770).

It is understood from FIG. 7, that upon completion of either step 750 or step 770 that execution returns to step 702 for the fetching of a new sample and the formation and evaluation of a new window at step 704.

INTRUSION REDUCTION MODE NON-DELAYED SILENCE IMPLEMENTATION

Figure 7A:
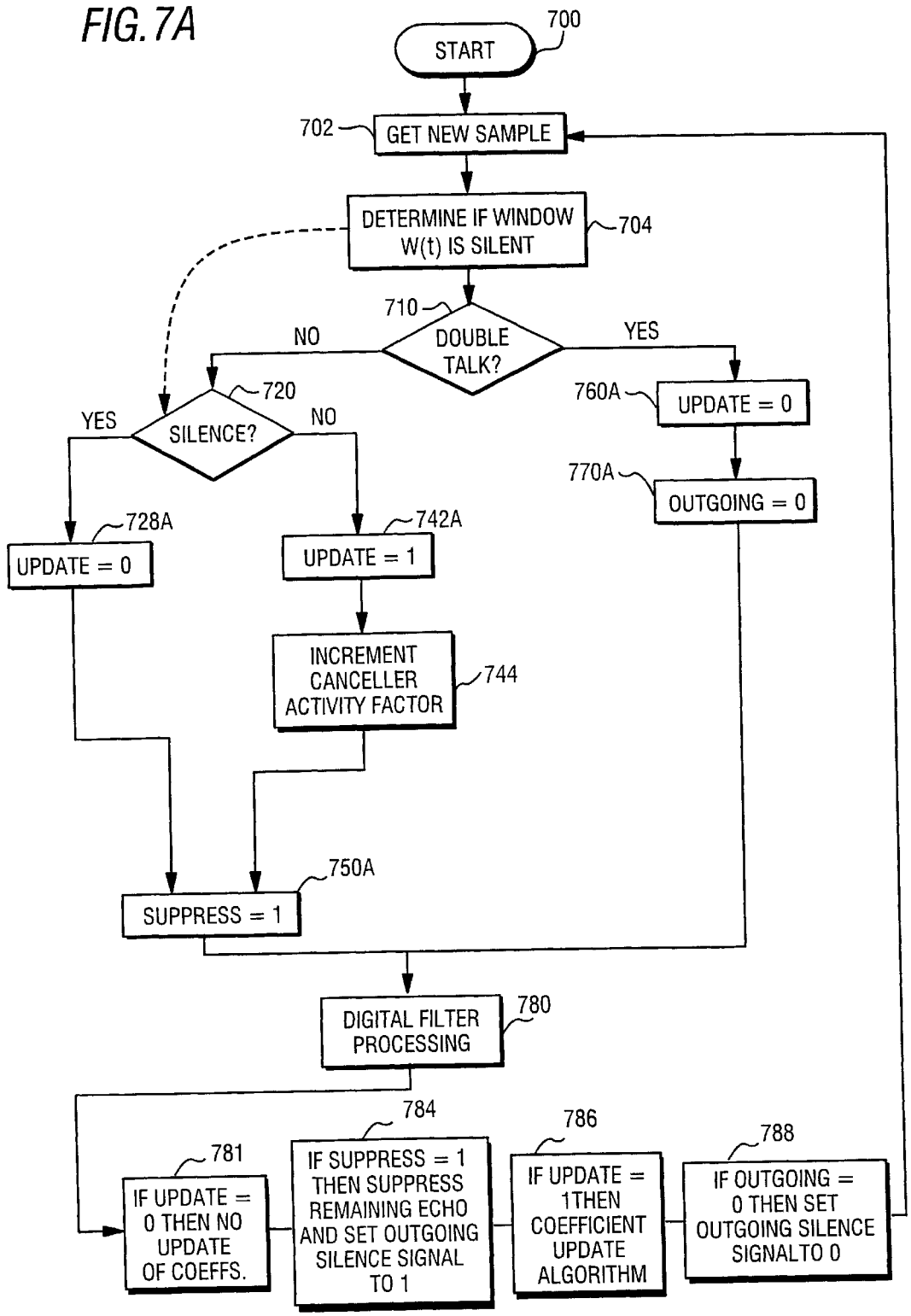
FIG. 7A is a flowchart of steps conducted by an echo canceller of the invention in an alternative implementation of an intrusion reduction mode.

Steps executed in an alternative or "non-delayed silence" implementation of the intrusion reduction mode are shown in FIG. 7A. The implementation of FIG. 7A basically differs from FIG. 7 in the same manner that FIG. 6A differs from FIG. 6—in relocation of the digital filter processing step, the use of special flags, and flag-dependent actions taken as a being understaken upon completion of the digital filter processing step. Similarly, as was the case with the "non-delayed silence" implementation of FIG. 6A, the "non-delayed silence" implementation of FIG. 7A allows a determination of the beginning of the silence-affected period (either period 406 in FIG. 4 or period 506 in FIG. 5) to commence one sample earlier than would otherwise occur in the "delayed silence" implementation.

Steps in FIG. 7A that are identical to those of FIG. 7 are identically numbered. In contrast to FIG. 7, in the FIG. 7A implementation step 706 has been removed and, in lieu thereof, step 780 has been added. FIG. 7A also shows various "flag" steps which are suffixed with the letter "A" and which otherwise have step numbers corresponding to un-suffixed steps of FIG. 7. The flags employed in FIG. 7A are a SUPPRESS flag; and UPDATE flag; and an OUTGOING flag, the meanings of which are understood from the description of FIG. 6A. For example, when any remaining echo is to be suppressed, flag SUPPRESS is set to "1". If the outgoing silence detected signal on line 66 is to be set to "1", flag OUTGOING is set to "1". Flag SUPPRESS is reset to "0" and flag OUTGOING is reset to "1" upon obtaining each new sample at step 702. If filter coefficients are to be updated, flag "UPDATE" is set to "1".

Step 780 of FIG. 7A is the digital filtering processing step, which is executed upon completion of the either of the flag-setting steps 750 A or 770A. After the filter processing of step 780, appropriate ones of steps 781, 884, 786, and 788 are executed. Step 781 represents the fact that the FIR filter 52 coefficients are not updated if flag UPDATE is zero. At step 784, if flag SUPPRESS has been set to "1", silence processor 60 suppresses any remaining echo and the outgoing silence signal is set to "1". At step 786, if flag UPDATE has been set to "1", the coefficients of the FIR filter 52 are updated. At step 788, if flag OUTGOING has been set to "0", then the outgoing silence signal is set to "0".

Thus, in the FIG. 7A implementation, like the FIG. 6A implementation, output actions (e.g., the setting of the outgoing silence signal, insertion of noise, suppression of any remaining echo) as well as potential coefficient update occur after digital filter processing step 780. However, in view of the fact that digital filter processing step 780 occurs prior to receipt of a next sample, silence detection is advanced by one sample relative to the delayed silence implementation of FIG. 7.

It should be noted that any FIR adaptive transversal filter algorithm may be implemented by controller 54. Echo canceller 20 of this invention is therefore widely applicable and independent of the adaptive filter algorithm chosen.

In essence, echo suppression is the insertion of a loss (e.g., of 35 dB or more) or signal clipping in the echo return path (in outgoing signal e(t) on path 32 in FIG. 1). As stated herein, silence processor 60 suppresses any remaining echo.

Controller 54 controls the functions of adaptive FIR filter 52 by using the outputs from silence detector 50 and near-end speech detector 56. Controller 54 also provides the "silence detection signal on outgoing signal" signal on line 66 relative to outgoing data on path 32, which is useful for packet-based speech communication by Codecs which reduce bandwidth use during silent periods of speech. This is because, assuming correct operation of echo canceller 20, the near-end speech detector 56 should provide the basis for speech detection. When not in "double-talk", the outgoing silence detection signal on line 66 will be raised to a value of one, and otherwise set to a value of zero. When using echo canceller 20 with a Codec, the Codec can make use of silence detection signal on line 66 to save silence detection functionality, or as a confirmation of its own silence detection results.

Figure 3:
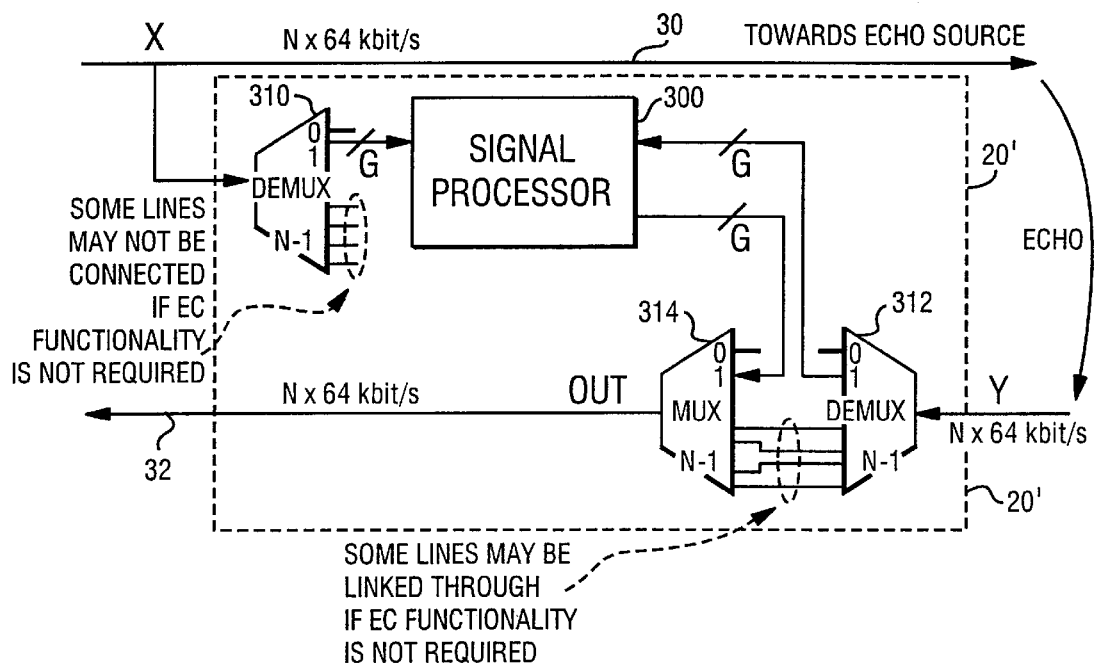
FIG. 3 is a schematic view of a particular hardware implementation of the echo canceller of FIG. 1.

FIG. 3 shows a particular hardware implementation of an echo canceller 20' of the invention. In echo canceller 20' the functions of the silence detector, the adaptive FIR filter, the cancellation controller, the near-end speech detector, the subtractor; and the silence processor are all performed by a signal processor 300.

In the implementation of FIG. 3, lines X, Y, and OUT are all N×64 kbit/s lines, since this implementation is directed towards ordinary PCM speech channels at 64 kbit/s. This means that these lines contain N time slots (TSs) at 64 kbit/s.

In addition to processor 300, echo canceller 20' includes demultiplexers (DEMUX) 310 and 312, and multiplexer (MUX) 314. DEMUX 310 is connected between incoming communications path 30 and signal processor 300; DEMUX 312 is connected between the near end and signal processor 300 for receiving the signal Y. DEMUXes 310 and 312 are employed to extract the individual 64 kbit/s signal from the N×64 kbit/s lines. MUX 314 is connected between signal processor 300 and outgoing communications path 32 to reconstruct the N×64 kbit/s structure from the individual 64 kbit/s lines.

Lines X, Y, and OUT and all the lines derived therefrom through the DEMUXes are synchronous or have been synchronized (that is, they are driven by the same clock). In addition, lines X, Y, and OUT and all the lines derived therefrom are symmetrical. In an example of a telephone conversation between User A and user B, if speech from User A to User B were carried in time slot number 1 of line X, then speech from User B to User A would be symmetrically carried in time slot number 1 of line Y.

The lines identified by the letter G in FIG. 3 are 64 kbit/s lines. However, in other embodiments lines G may be N×64 kbit/s lines depending on the capacity of the signal processor 300 (in which case, the MUX and DEMUX functions would suitably differ). In addition, in other embodiments lines G can be serial or parallel (i.e., bus) lines.

If lines X, Y, and OUT have N=1 (i.e., only one 64 kbit/s channel), then the MUX and DEMUX functions do not exist and lines X, Y, and OUT are connected directly to signal processor 300. On the other hand, in other embodiments lines X and Y are comprised of a number of N×64 kbit/s lines.

Different basic speech bit rates from 64 kbit/s can also be used, such as lower bit rates for compressed speech. In this case, instead of the ordinary PCM compression functionality needed with signal processor 300, more complicated expansion and compression techniques are required depending on the type of compressed speech (i.e., bearer service).

While FIG. 3 illustrates an implementation showing one signal processor 300, it should be understood in that, in other implementations, a plurality of general-purpose DSP devices can be employed. Alternatively, the functions of the echo cancellers of the present invention are carried out, in yet other implementations, using one or more integrated circuits (e.g., ASICs). Such circuits may be designed to perform the required digital filtering and algorithm control applications using logic or may be embedded DSP device(s).

Figure 8:
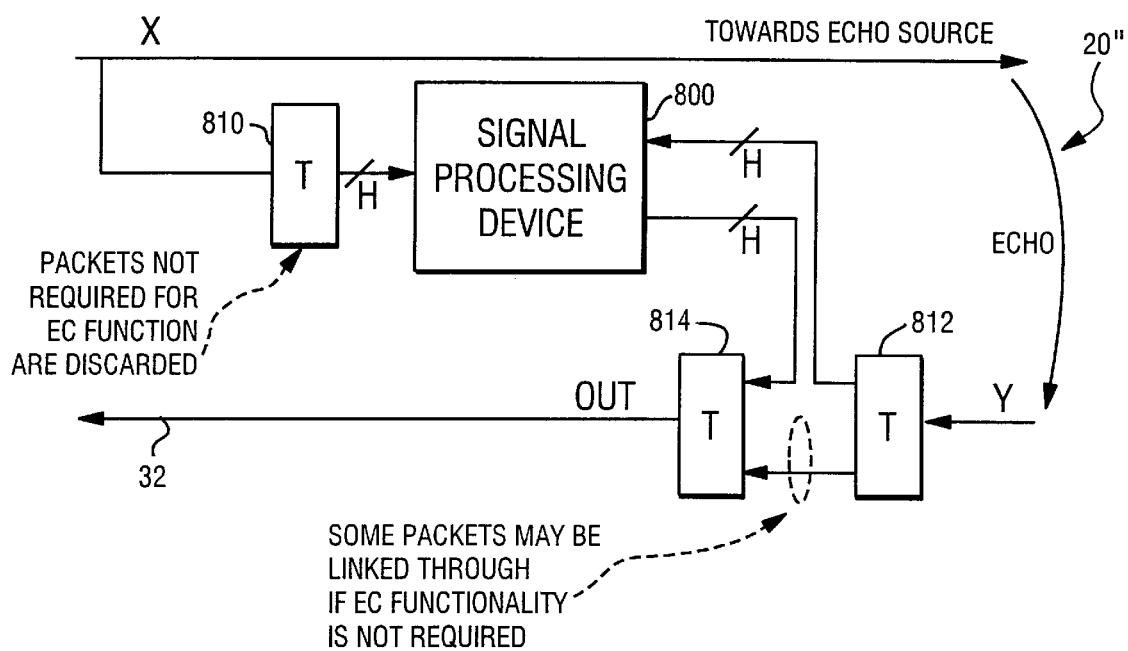
FIG. 8 is a schematic view of a hardware implementation of the echo canceller of FIG. 1 for packet-based speech.

FIG. 8 shows another hardware implementation of an echo canceller 20" of the invention, specifically an implementation for packet-based speech. In echo canceller 20", the functions of the silence detector, the adaptive FIR filter, the cancellation controller, the near-end speech detector, the subtractor, and the silence processor are all performed by a signal processor 800. In FIG. 8, line X, Y, and OUT carry packet-based speech (e.g., ATM). In the locations whereat the FIG. 3 implementation had MUXes or DEMUXes, the FIG. 8 implementation has termination blocks 810, 812, and 814. Termination blocks have a first side which receives the packet-based speech and a second side at which the packet-based speech is regenerated. Lines H are interfaces which may be packet-based or synchronous N×64 kbit/s based.

When interfaces H of FIG. 8 are packet-based, the termination blocks terminate the packet-based structure of the required packets and places the user contents (payload) on the H interface maintaining the packet-based approach (e.g. a UTOPIA interface in the case of ATM protocol). When interfaces H of FIG. 8 are synchronous N×64 kbit/s based, the termination blocks perform a complete packet termination and extract the 64 kbit/s times slots in any of the structures described previously and require the MUX and DEMUX components shown in FIG. 3.

Figure 9:
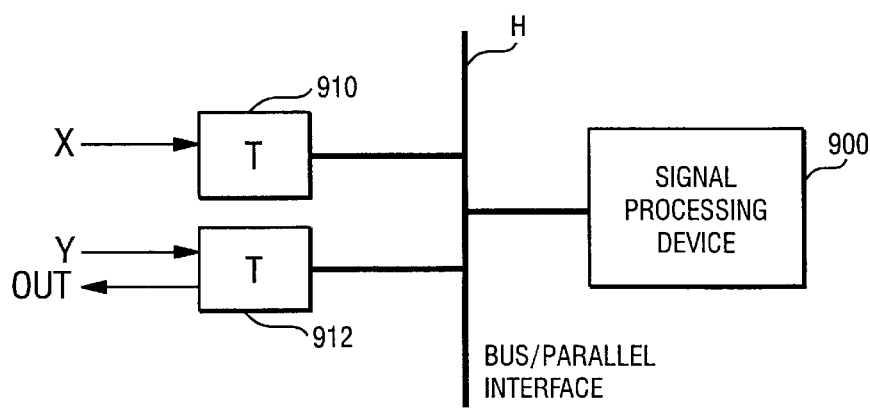
FIG. 9 is a schematic view of a hardware implementation of the echo canceller of FIG. 1 for packet-based speech using a bus or parallel interface.

Interfaces H may all coincide in a bus or parallel interface as shown in FIG. 9 (i.e., especially for packet-based interfaces such as ATM). FIG. 9 shows signal processor 900; termination blocks 910, 912, lines X, Y, and OUT, as well as interface H.

The problem with the implementation of existing echo cancellers is in their great computational complexity, even for the simplest algorithms. The present invention's use of silence detection as a means to disable echo canceller 20 from adapting itself to "silent" (e.g. only noise) periods of speech and disabling FIR filter 52 brings a considerable reduction in the number of adaptations. Speech tests have shown that on average a speaker will actively produce speech, including inter-syllable pauses, only 40% of the time. Therefore, potentially over a whole conversation, a 60% reduction in complexity is achieved with echo canceller 20 of the present invention.

The NLMS algorithm well-known in literature has the a complexity for a non-optimized version using direct form convolution as shown in Table 1.

TABLE 1

| Multiplications | Additions | Divisions |
|---|---|---|
| 3 ML | 3 ML | L |

In Table 1, "M" represents the number of filter taps and "L" represents the length of data to be processed. By using echo canceller 20 of the present invention, the variable L is reduced by 60%, thus reducing the overall complexity of the echo canceller calculations by the same amount. Therefore, over a 5 minute conversation, this entails processing only over 120 s (i.e. 960000 samples) rather than 300 s (i.e. 2400000 samples).

Also, small silence decision window lengths enable an even greater reduction, since they detect inter-syllable pauses as well. Simulations on just over two seconds of continuous speech proved that a silence window of 10 ms reduces the number of samples to be considered for computation by at least 5%. Applying this value on a whole conversation, this entails a further reduction of 5% processing on the 40% of remaining speech. Over a 5 minute conversation this means that 6 extra seconds of processing, or 48000 samples, will be saved on top of the gains calculated previously.

The silence-improved echo cancellers of the present invention therefore allow echo cancellation on longer delays than possible up to now with signal processing devices. Alternatively, it allows the concurrent processing of more channels. In either cases, it greatly reduces costs.

The echo cancellers of the present invention have applicability to all echo cancellation devices, including Codecs in general and packet protocols such as ATM (asynchronous transfer mode). The silence detection signal output on line 66 from controller 54 is useful for speech transmission which makes use of silence suppression for bandwidth optimization. This "silence detection on outgoing signal" signal may be used to drive mechanisms including (but not limited to) silence suppression mechanisms in packet based communications.

The actual silence calculation made by the echo cancellers of the present invention depends only on energy levels of the incoming signal, which further simplifies the continuous window-based silence operations required.

While the invention has been particularly shown and described with reference to the preferred embodiments thereof, it will be understood by those skilled in the art that various alterations in form and detail may be made therein without departing from the spirit and scope of the invention. For example, rather than merely setting coefficients of FIR filter 52 to zero and using the Past Silence condition as illustrated in the drawings, a filter enable parameter may be utilized and set to disable FIR filter 52 when multiplication is not to occur using filter coefficients.

Also, it should be understood that the sequence of various method steps shown herein can be varied. For example, the window-based silence detection of step 604 can alternately be performed in parallel with step 606, and likewise step 704 can be performed in parallel with step 706. Similarly, it should be understood that step 606 can be performed before step 604, and that step 706 can be performed before step 704.

The embodiments of the invention in which an exclusive property or privilege is claimed are defined as follows:

1. A line echo cancellation method comprising:

sampling a signal on an incoming communications path to obtain a sample at time t(m);

determining whether a window W(m) of samples contains silence, the window W(m) including the sample obtained at the time t(m) and prior samples, and if the window W(m) contains silence, then setting coefficients of an adaptive filter of an echo canceller at silence detection values prior to receipt of a sample at time t(m+1); otherwise, using the sample obtained at time t(m) to update coefficients of an adaptive filter, using the adaptive filter as updated to generate an echo estimate after a sample is obtained at time t(m+1), and using the echo estimate to modify a signal on an outgoing communications path;

wherein a time duration of window W(m) is longer than an echo path pure delay and wherein, in determining the timing of the silence-affected period on an outgoing communication path;

at an end of a first instance of a window W(s) having the silence detected throughout its duration, the silence-affected period is commenced, and upon cessation of the silence in the signal on the incoming communication path, the silence-affected period is terminated.

2. A line echo cancellation method comprising:

sampling a signal on an incoming communications path to obtain a sample at time t(m);

determining whether a window W(m) of samples contains silence, the window W(m) including the sample obtained at the time t(m) and prior samples, and if the window W(m) contains silence, then setting coefficients of an adaptive filter of an echo canceller at silence detection values prior to receipt of a sample at time t(m+1); otherwise, using the sample obtained at time t(m) to update coefficients of an adaptive filter, using the adaptive filter as updated to generate an echo estimate after a sample is obtained at time t(m+1), and using the echo estimate to modify a signal on an outgoing communications path;

wherein a time duration of window W(m) is shorter than an echo path pure delay and wherein, in determining the timing of the silence-affected period on an outgoing communication path:

the silence-affected period is commenced at a point in the signal on the outgoing communication path which corresponds to an end of a first instance of a window having the silence detected throughout its duration; and the silence-affected period is terminated at a predetermined anticipation interval prior to a point in the signal on the outgoing communication path which corresponds to cessation of the silence in the signal on the incoming communication path.

3. A line echo cancellation method comprising:

sampling a signal on an incoming communications path to obtain a sample at time t(m);

determining whether a window W(m) of samples contains silence, the window W(m) including the sample obtained at the time t(m) and prior samples, and if the window W(m) contains silence, then setting coefficients of an adaptive filter of an echo canceller at silence detection values prior to receipt of a sample at time t(m+1); otherwise, using the sample obtained at time t(m) to update coefficients of an adaptive filter, using the adaptive filter as updated to generate an echo estimate after a sample is obtained at time t(m+1), and using the echo estimate to modify a signal on an outgoing communications path;

performing digital filter processing using the silence detection values of the adaptive digital filter prior to receipt of a sample at time t(m+1).

4. The method of claim 1, 2 or 3 wherein if the window W(m) contains silence, determining a timing of a silence-affected period on the outgoing communications path;

wherein if the window W(m) contains silence, prior to receipt of a sample at time t(m+1) conducting one of the following:

applying a predetermined noise on the outgoing communication path during the silence-affected period;

suppressing any remaining echoes on the outgoing communication path that are not suppressed by the filter of the echo canceller.

5. The method of claim 1, 2, or 3, wherein the coefficients are set to zero and maintained at zero.

6. The method of claim 1, 2 or 3, wherein the coefficients are frozen at coefficient values which preceded the detecting of silence.

7. The method of claim 2, wherein the predetermined anticipation interval is related to a length of the window.

8. The method of claim 7, wherein the predetermined anticipation interval is the length of the window divided by a constant.

9. The method of claim 8, wherein the constant ranges from 3 to 10.

10. The method of claim 2, wherein a length of the window is less than the echo path pure delay and greater than zero.

11. The method of claim 1, 2, or 3, wherein the coefficients of the adaptive filter are set at the silence detection values prior to receipt of a sample at time t(m+1) so long as double-talk is not detected.

12. The method of claim 1, 2, or 3, wherein the coefficients of the adaptive filter are maintained at the silence detection values throughout a silence-affected period on the outgoing communications path.

13. A method of determining a silence-affected period in a line echo cancellation procedure, the method comprising:

determining whether windows of samples received on an incoming communication path contain silence, the windows being longer in time duration than an echo path pure delay;

commencing the silence-affected period on an outgoing communication path at an end of a first window having the silence detected throughout its duration; and terminating the silence-affected period upon cessation of the silence in the signal on the incoming communication path.

14. A method of determining a silence-affected period in an echo cancellation procedure, the method comprising:

determining whether windows of samples received on an incoming communication path contain silence, the windows being shorter in time duration than an echo path pure delay;

commencing the silence-affected period at a point in the signal on the outgoing communication path which corresponds to an end of a first window having the silence detected throughout its duration; and terminating the silence-affected period at a predetermined anticipation interval prior to a point in the signal on the outgoing communication path which corresponds to cessation of the silence in the signal on the incoming communication path.

15. Apparatus for determining a silence-affected period in a line echo cancellation procedure, the apparatus comprising:

means for determining windows of samples received on an incoming communication path contain silence, the windows being longer in time duration than an echo path pure delay;

means for commencing the silence-affected period on an outgoing communication path at an end of a first window having the silence detected throughout its duration; and means for terminating the silence-affected period upon cessation of the silence in the signal on the incoming communication path.

16. Apparatus for determining a silence-affected period in an echo cancellation procedure, the method comprising:

means for determining whether windows of samples received on an incoming communication path contain silence, the windows being shorter in time duration than an echo path pure delay;

means for commencing the silence-affected period at a point in the signal on the outgoing communication path which corresponds to an end of a first window having the silence detected throughout its duration; and means for terminating the silence-affected period at a predetermined anticipation interval prior to a point in the signal on the outgoing communication path which corresponds to cessation of the silence in the signal on the incoming communication path.

* * * * *